(12) United States Patent
Hirano et al.

(10) Patent No.: US 7,894,471 B2
(45) Date of Patent: Feb. 22, 2011

(54) CONTENT DISTRIBUTION SYSTEM, CONTENT DISTRIBUTION METHOD, TERMINAL APPARATUS IN CONTENT DISTRIBUTION SYSTEM, AND RECORDING MEDIUM ON WHICH PROGRAM IS RECORDED

(75) Inventors: Tadashi Hirano, Nagoya (JP); Yoshihiko Hibino, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 170 days.

(21) Appl. No.: 12/382,414

(22) Filed: Mar. 16, 2009

(65) Prior Publication Data
US 2009/0180493 A1 Jul. 16, 2009

Related U.S. Application Data

(63) Continuation-in-part of application No. PCT/JP2007/065724, filed on Aug. 10, 2007.

(30) Foreign Application Priority Data
Sep. 29, 2006 (JP) ............................... 2006-270135

(51) Int. Cl.
H04J 3/22 (2006.01)

(52) U.S. Cl. ...................................... 370/464; 370/255
(58) Field of Classification Search ................. 370/464, 370/462, 401, 255; 709/217.205, 201
See application file for complete search history.

(56) References Cited

U.S. PATENT DOCUMENTS
2007/0195796 A1 8/2007 Ushiyama et al.

FOREIGN PATENT DOCUMENTS
| EP | 1 775 890 A1 | 4/2007 |
| EP | 1 811 402 A1 | 7/2007 |
| JP | A-2004-246790 | 9/2004 |
| JP | A-2006-041784 | 2/2006 |
| JP | A-2006-099503 | 4/2006 |
| WO | WO 2006/038433 A1 | 4/2006 |

OTHER PUBLICATIONS

Sasaki et al., "P2P ni Okeru Jisu Chokkei no Chiisai Overlay Network Koseiho," *Technical Report of IEICE*, May 2006, vol. 106, No. 42, pp. 61-66.

*Primary Examiner*—Ricky Ngo
*Assistant Examiner*—Iqbal Zaidi
(74) *Attorney, Agent, or Firm*—Oliff & Berridge, PLC

(57) ABSTRACT

To provide a content distribution system, method, and the like wherein, in a distribution aspect in which, being made a tree-shaped hierarchical structure, content data are forwarded from a content distribution apparatus at an apex to a downstream terminal apparatus, there is no need to separately provide a connection management server for managing the tree-shaped hierarchical structure. In a content distribution system in which a content distribution apparatus and a plurality of terminal apparatus participate, when configuring a distribution aspect in which the terminal apparatus are logically connected in a tree-shaped hierarchical structure, with the content distribution apparatus as an apex, and content data are sequentially forwarded from the content distribution apparatus to a downstream terminal apparatus, one terminal apparatus among the plurality of terminal apparatus participating in the content distribution system is caused to manage a connection condition of the tree-shaped hierarchical structure.

12 Claims, 27 Drawing Sheets

Fig. 4

| PREFIX | | -0- | -1- | -2- | -3- |
|---|---|---|---|---|---|
| LEVEL 1 | TERMINAL ID | 0100 | 1133 | 2213 | 3213 |
| | IP ADDRESS | 10.123.20.73 | | 51.10.20.13 | 41.120.10.23 |
| LEVEL 2 | TERMINAL ID | 1003 | (11xx) | 1221 | 1313 |
| | IP ADDRESS | 21.10.210.13 | | 21.13.21.13 | 11.130.20.143 |
| LEVEL 3 | TERMINAL ID | 1103 | 1110 | 1122 | (113x) |
| | IP ADDRESS | 41.10.217.3 | 111.12.20.1 | 61.11.20.13 | |
| LEVEL 4 | TERMINAL ID | 1130 | 1131 | 1132 | (1133) |
| | IP ADDRESS | 121.150.10.13 | 216.11.210.11 | 210.10.10.13 | |

Fig. 7

CHANNEL ID "2202" CONNECTION CONDITION INFORMATION

| NO | IP ADDRESS | UPSTREAM APPARATUS NUMBER | DOWNSTREAM APPARATUS NUMBER | ALLOWABLE DOWNSTREAM QUANTITY | DOWNSTREAM UNCONNECTED QUANTITY |
|---|---|---|---|---|---|
| 1 | 92.111.223.76 | — — | 2, 3 | 2 | 0 |
| 2 | 31.120.10.23 | 1 | 4 | 2 | 1 |
| 3 | 111.12.20.1 | 1 | 5 | 1 | 0 |
| 4 | 10.123.20.73 | 2 | 8 | 3 | 2 |
| ⋯⋯ | ⋯⋯ | ⋯⋯ | ⋯⋯ | ⋯⋯ | |

Fig. 10

|   | CONTENT ID | LOCATION INFORMATION | INTRODUCTION TIME |
|---|---|---|---|
| 0 | 3020 | 60.32.72.101 | 11/04 11:32.110 |
| 1 | 3020 | 221.172.2.21 | 11/04 11:33.010 |
| 2 | 3020 | 61.15.12.1 | 11/04 11:35.090 |
| 3 | 3020 | 60.32.72.103 | 11/04 11:36.000 |
| 4 | 3020 | 192.168.0.21 | 11/04 11:36.310 |
| 5 | 3020 | 221.173.2.22 | 11/04 11:37.240 |
| 6 | 3020 | 152.105.11.123 | 11/04 11:38.391 |
| 7 | 3020 | 32.125.12.1 | 11/04 11:40.110 |
| 8 | 3020 | 60.32.72.104 | 11/04 11:41.220 |
| 9 | 3020 | 221.171.12.2 | 11/04 11:41.345 |
| 10 | 3021 | 60.32.72.107 | 11/04 11:25.450 |
| 11 | 3021 | 192.168.12.2 | 11/04 11:32.010 |
| 12 | 3021 | 61.15.12.5 | 11/04 11:38.110 |
| 13 | 3021 | 152.105.21.123 | 11/04 11:40.533 |

US 7,894,471 B2

CONTENT DISTRIBUTION SYSTEM, CONTENT DISTRIBUTION METHOD, TERMINAL APPARATUS IN CONTENT DISTRIBUTION SYSTEM, AND RECORDING MEDIUM ON WHICH PROGRAM IS RECORDED

CROSS-REFERENCE TO RELATED APPLICATION(S)

The present application is a Continuation-in-Part of International Application PCT/JP2007/065724 filed on Aug. 10, 2007, which claims the benefits of Japanese Patent Application No. 2006-270135 filed on Sep. 29, 2006.

BACKGROUND

1. Field

The present invention relates to a content distribution technology. In particular, it relates to a content distribution system, a content distribution method, a terminal apparatus in the content distribution system, and a recording medium on which a program is recorded, wherein a plurality of terminal apparatus are logically connected in multilayers in a hierarchical structure in a network, with a content distribution apparatus which stream-distributes content data as an apex, and the content data transmitted from the content distribution apparatus are sequentially stream-distributed by a relay function of the terminal apparatus from an upstream terminal apparatus to a downstream terminal apparatus in the hierarchical structure.

2. Description of the Related Art

In recent years, a content distribution service has been started which carries out a stream distribution of data of content (hereafter called "content data"), such as music, a movie, or a talk program, via a network such as the Internet. Herein, a stream distribution being a distribution method which distributes content data in a stream format which a client terminal apparatus (hereafter called simply a "terminal apparatus") can stream-receive the content data, the terminal apparatus can reproduce the stream-distributed content data while receiving them. Also, as a stream distribution format, there is a broadcast format, wherein a content data distribution time is fixed, and an on-demand format, which stream-distributes content data to individual terminal apparatus in response to a request from the terminal apparatus.

A broadcast format content distribution service has, to date, principally been one which carries out a distribution of content directly from one content distribution apparatus to a plurality of terminal apparatus but, in recent years, a content distribution system has been proposed which can reduce a burden and a concentration of traffic, without increasing the content distribution apparatus, by using a relay of content data among the terminal apparatus, that is, a P2P communication format (for example, refer to Japanese Unexamined Patent Publication 2006-41784).

This content distribution system is one in which a plurality of terminal apparatus are logically connected in multilayers in a tree-shaped hierarchical structure, with a content distribution apparatus as an apex, and content data are sequentially distributed from the content distribution apparatus to a downstream terminal apparatus.

That is, the content data distributed from the content distribution apparatus are distributed to a terminal apparatus positioned on a topmost layer (a first layer), the terminal apparatus positioned on the topmost layer relays the content data distributed from the content distribution apparatus to a terminal apparatus positioned on a second layer, and the relay of the content data is carried out until they are distributed to a terminal apparatus positioned furthest downstream.

SUMMARY

However, the terminal apparatus, when newly participating in the tree-shaped hierarchical structure, or when connecting to a new connection destination apparatus in conjunction with a withdrawal from the hierarchical structure of an upstream terminal apparatus (connection destination apparatus) to which it has been connected, does not know to which terminal apparatus, among the terminal apparatus configuring the hierarchical structure, it should connect.

Therein, in a heretofore known content distribution system having a tree-shaped hierarchical structure, a connection destination management server being provided, which manages a connection condition of the hierarchical structure as topology information, and updates the topology information every time a condition of the hierarchical structure changes, the connection destination management server notifies of a connection destination candidate in response to a request from the terminal apparatus.

However, in the heretofore known content distribution system having a tree-shaped hierarchical structure, a separate dedicated connection destination management server has to be provided. Moreover, it has been necessary for the terminal apparatus to know location information of the connection destination management server in advance.

The invention having been contrived bearing in mind the heretofore described problem, it is desirable to provide a content distribution system, method, and the like, with which it is not necessary to separately provide a dedicated connection destination management server.

According to one aspect of the invention, there is provided a content distribution system including a plurality of terminal apparatus logically connected in multilayers in a hierarchical structure in a network, with a content distribution apparatus which stream-distributes content data as an apex, the content data transmitted from the content distribution apparatus being sequentially stream-distributed by a relay function of the terminal apparatus from an upstream terminal apparatus to a downstream terminal apparatus in the hierarchical structure. Channel identification information is allotted to each channel in which the content data are stream-distributed, and unique apparatus identification information is allotted to each of the plurality of terminal apparatus. The terminal apparatus includes a routing table storage module which stores a routing table in which are correlated one portion of apparatus identification information among the apparatus identification information in the content distribution system, and location information of apparatus corresponding to the apparatus identification information; a connection process module which, when participating in the hierarchical structure, transmits a connection destination introduction request message for connecting to a connection destination candidate for the hierarchical structure, based on the information of the routing table storage module, with the channel identification information as destination identification information, and connects to the connection destination candidate; a message destination determination module which, when receiving a message via the network, based on the destination identification information of the received message and on the routing table, determines whether or not the received message is addressed to its own terminal apparatus; a connection condition information storage module which, when it is determined by the message destination determination module that the received message is addressed to its own terminal apparatus, and that the received message is a connection condition information message including information on a connection condition of the content distribution apparatus or the terminal apparatus, stores the connection condition information; and a connection destination candidate selection module which, when it is determined by the message destination determination module that the received message is addressed to its own terminal apparatus, and that the received message is the connection destination introduction request message, selects a connection destination candidate from the connection condition information stored in the connection condition information storage module.

By configuring in this way, terminal apparatus to which is allotted apparatus identification information having a predetermined relationship with channel identification information also operate as apparatus which manage the condition of the hierarchical structure of the channel corresponding to the channel identification information. As information from these apparatus on the content distribution apparatus or terminal apparatus connection condition is received and stored and, on it being determined that a message addressed to its own terminal apparatus is a connection destination introduction request message, a connection destination candidate is selected from the stored connection condition information, it is possible to provide a content distribution system having a tree-shaped or chain-shaped hierarchical structure, without providing a separate dedicated connection destination management server apart from the content distribution apparatus and terminal apparatus.

BRIEF DESCRIPTION OF THE DRAWINGS

FIG. 4 is a diagram showing one example of a routing table in a terminal apparatus of FIG. 1;

FIG. 7 is a diagram showing one example of a connection condition information table in the terminal apparatus of FIG. 1;

FIG. 10 is a diagram showing one example of an index table in the terminal apparatus of FIG. 1;

DETAILED DESCRIPTION

Hereafter, a description will be given, based on the drawings, of a preferred embodiment of the invention. The embodiment to be described hereafter is an embodiment of a case in which the invention is applied to a content distribution system, which has content data such as music data and image data as information to be distributed.

1. Configuration and the Like of Content Distribution System

Figure 1:
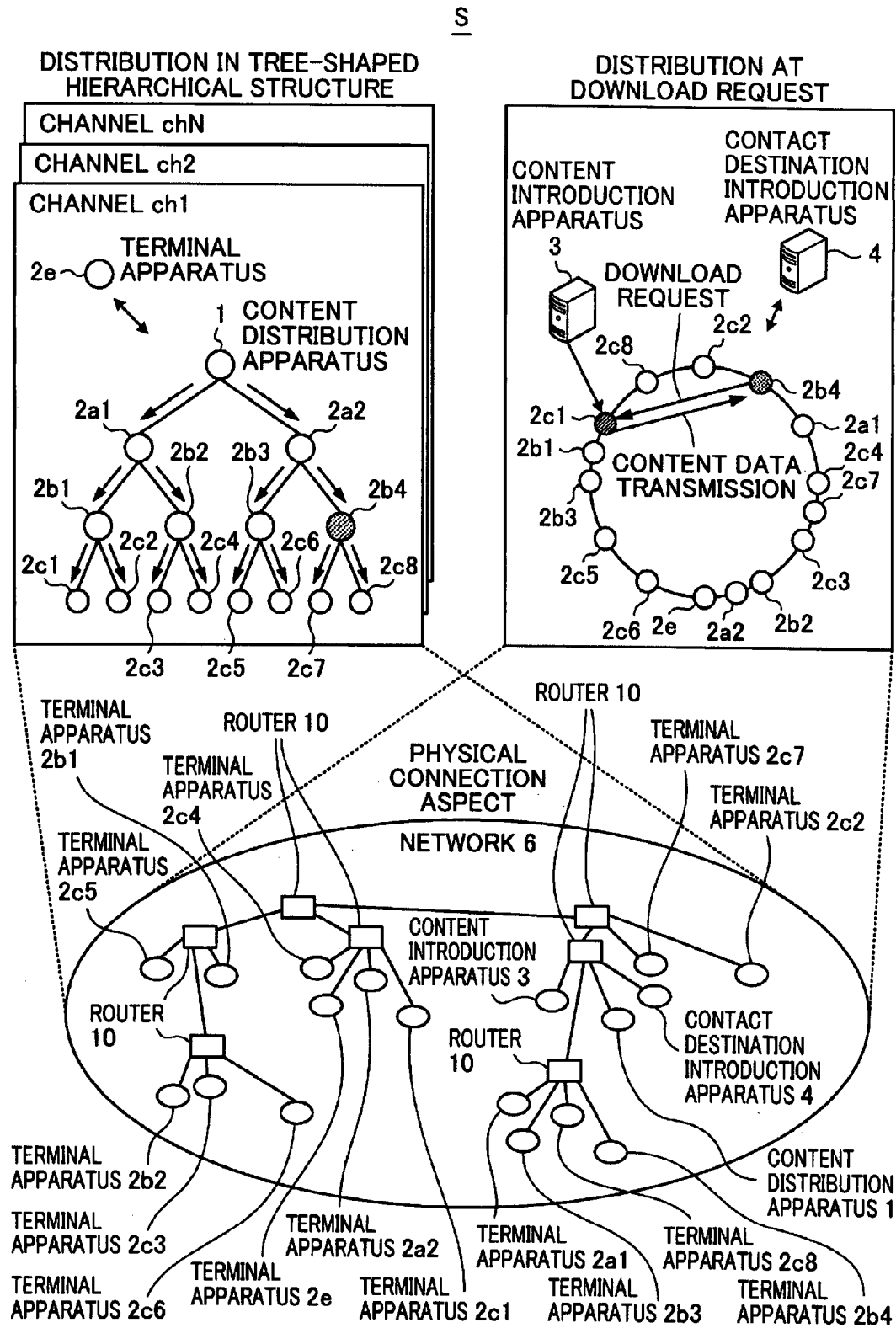
FIG. 1 is a diagram showing an example of an outline configuration of a content distribution system according to an embodiment.

FIG. 1 is a diagram showing an example of an outline configuration of a content distribution system S according to the embodiment. A content distribution apparatus 1, terminal apparatus 2a1, 2a2, 2b1 to 2b4, 2c1 to 2c8, and 2e, a content introduction apparatus 3, and a contact destination introduction apparatus 4, which configure the content distribution system S, are disposed dispersed in a network 6 represented by the Internet, as in a physical connection aspect shown in FIG. 1. Although apparatus not directly connected with the content distribution system S are also connected to the network 6, they will be omitted here. Also, when referring to any one terminal apparatus of the terminal apparatus 2a1, 2a2, 2b1 to 2b4, 2c1 to 2c8, and 2e, or to all of the terminal apparatus, it or they may be referred to as the terminal apparatus 2, for the sake of convenience.

A unique manufacturing number (for example, a MAC address) and IP (Internet Protocol) address (location information) being allotted, as information identifying each apparatus, to the content distribution apparatus 1, the terminal apparatus 2a1, 2a2, 2b1 to 2b4, 2c1 to 2c8, and 2e, the content introduction apparatus 3, and the contact destination introduction apparatus 4, these apparatus are connected via a router 10, or the like, to the network 6, which is one example of a network. Herein, a communicative connection is enabled by transmitting a packet including a header with an objective connection destination apparatus IP address as a destination IP address, and an own apparatus IP address as a transmission source IP address.

In the content distribution system in the embodiment, transmitting and receiving data between the content distribution apparatus and the terminal apparatus 2, and among the terminal apparatus 2, disposed dispersed in the network by using a distributed hash table (hereafter called a "DHT"), both a content data distribution aspect in a hierarchical structure, and a content data distribution aspect at a download request, can be implemented.

Herein, as the content data distribution aspect in the hierarchical structure, a description will be given of, as an example, a distribution aspect wherein, for each broadcast channel (hereafter called simply a "channel"), a plurality of terminal apparatus 2 are managed by a predetermined terminal apparatus 2 in such a way as to be logically connected in multilayers in the network, in a hierarchical structure with the content distribution apparatus 1, which stream-distributes content data, as an apex, and the content data transmitted from the content distribution apparatus 1 are sequentially stream-distributed, by a relay function of the terminal apparatus 2, from upstream terminal apparatus 2 to downstream terminal apparatus 2 in the hierarchical structure, in each channel. Although a description will be given hereafter taking the content distribution apparatus 1 to have a function of distributing content data of one channel, it is also acceptable to arrange in such a way that content data of a plurality of channels are distributed by the content distribution apparatus 1.

Also, as the content data distribution aspect at a download request, a description will be given of, as an example, a distribution aspect wherein, based on a content data download request from one terminal apparatus 2 among the plurality of terminal apparatus 2, another terminal apparatus 2, which holds the content data, distributes the content data.

1.1. DHT Outline

Firstly, a description will be given of an algorithm using the DHT according to the embodiment.

In the content distribution system S, when a mutual exchange of information is carried out between the terminal apparatus 2, or between the content distribution apparatus 1 and the terminal apparatus 2, they have to know each other's IP address, which is the location information.

Although the content distribution apparatus 1 and each terminal apparatus 2 know the location information of all the apparatus participating in the content distribution system S by a simple method, in the event that a quantity of apparatus rises to several tens of thousands, or several hundreds of thousands, it is not realistic to attempt to remember the location information of all the apparatus participating in the content distribution system S. Also, in the event that power of a given terminal apparatus 2 is frequently turned on or off, the location information of the given terminal apparatus 2 stored in each terminal apparatus 2 being updated frequently, operation becomes difficult.

Therein, only the location information of a minimally necessary portion of apparatus, among all the apparatus participating in the content distribution system S, being stored in each apparatus, regarding apparatus of which the location information is not stored, a system is being considered whereby content is delivered by forwarding information amongst the apparatus.

Figure 2:
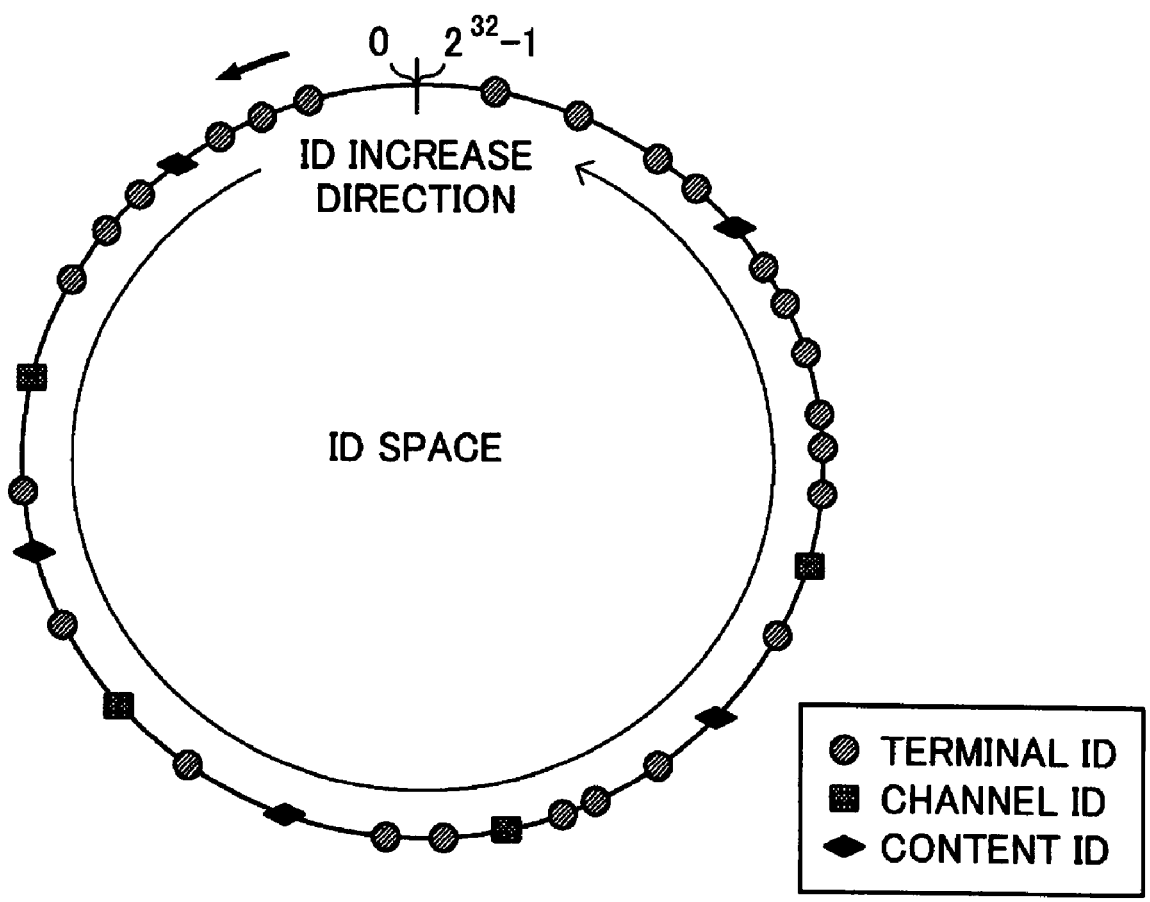
FIG. 2 is a diagram showing an example of an outline operation of the content distribution system according to the embodiment.

As one example of this kind of system, a kind of overlay network shown in FIG. 2 is constructed by the algorithm using the DHT. That is, the overlay network, being a network configuring a virtual link (a logical connection) formed using the already existing network 6, is a P2P grid type distribution aspect.

In the embodiment, with the overlay network constructed by the algorithm using the DHT as a precondition, the content distribution apparatus 1 and terminal apparatus 2 disposed in the overlay network are referred to as the content distribution apparatus 1 and terminal apparatus 2 participating in the content distribution system S. Participation in the content distribution system S is effected by an apparatus which is not yet participating sending a participation request to an apparatus which is already participating.

Terminal ID

A unique number is given to each apparatus as terminal ID, which is an identification number of the content distribution apparatus 1 and terminal apparatus 2 participating in the content distribution system S. It is necessary to give this number a number of bits equivalent to a maximum operational number of apparatus which participate in the content distribution system S. For example, in a case of a number of 128 bits, it is possible to operate $2^{128} \approx 340 \times 10^{36}$ apparatus.

More specifically, the terminal ID of each apparatus, being hash values obtained by hashing a value unique to each apparatus, such as the IP address or manufacturing number of each apparatus, with a common hash function (a hash algorithm), are disposed, dispersed without bias, in one ID space. As long as the relevant IP address or manufacturing number differs, a probability of terminal ID calculated by hashing with the common hash function in this way having the same value is extremely low. As the hash function is public knowledge, a detailed description will be omitted. Also, in the embodiment, a value of the IP address (a global IP address) hashed with the common hash function will be taken as the terminal ID.

Channel ID

The content data distribution aspect in the hierarchical structure, as heretofore described, is formed for each channel. Channel identification information (hereafter called "channel ID"), which is identification information unique to each channel, is given to the channels too.

Herein, the channel ID is made the same length as the terminal ID (for example, 128 bits, or the like), and a keyword such as, for example, a channel name (a channel title), or channel outline information (a genre) is generated by hashing with the same common hash function as when the terminal ID is acquired (that is, it is disposed in the same ID space as the hash value of the terminal apparatus 2 IP address). Herein, the terminal apparatus 2 having the terminal ID nearest to the hash value (for example, the most leading digits match, while the terminal ID does not exceed the channel ID) becomes the terminal apparatus 2 which manages the hierarchical structure of the channel (hereafter called a "connection management terminal apparatus").

Herein, "managing the hierarchical structure of the channel" means managing connection condition information of the content distribution apparatus 1 and terminal apparatus, logically connected in a tree-shaped hierarchical structure, in order to stream-receive the content data distributed by the content distribution apparatus 1. Also, the IP address of the content distribution apparatus 1 and terminal apparatus 2 configuring the tree-shaped hierarchical structure, connection information indicating which apparatus is connected to which apparatus, and the like, are included in the "connection condition information". An example of the connection condition information is shown in FIG. 7. A detailed description of FIG. 7 will be given hereafter.

Then, the connection management terminal apparatus, in the content distribution system S, manages in such a way that a plurality of the terminal apparatus 2 are logically connected in multilayers in the tree-shaped hierarchical structure, with the content distribution apparatus 1 as the apex. In the embodiment, a description will be given of the tree-shaped hierarchical structure but, not being limited to this, it is also acceptable that the plurality of terminal apparatus 2 are logically connected in multilayers in a chain-shaped hierarchical structure.

Content ID

Also, content data distributed in the distribution aspect at a download request are introduced to the terminal apparatus 2 by the content introduction apparatus 3, but identification information (hereafter called "content ID"), unique to each item of content data, is given to the content data too.

Then, the content ID is made the same length as the terminal ID (for example, 128 bits, or the like), and a keyword such as, for example, a content name (a content title), or content outline information (a synopsis) is generated by hashing with the same common hash function as when the terminal ID is acquired (that is, it is disposed in the same ID space as the hash value of the terminal apparatus 2 IP address). Herein, the terminal apparatus 2 having the terminal ID nearest to the hash value (for example, the most leading digits match) holds information linking to the terminal apparatus 2 (hereafter called a "content holding terminal apparatus") which holds the content data distributed in the distribution aspect at a download request, that is, it holds the IP address which is the location information of the content holding terminal apparatus.

The content holding terminal apparatus is randomly decided on by the content introduction apparatus 3. That is, the content introduction apparatus 3 randomly decides on one or more terminal apparatus 2 which are to hold the content data, and transmits the content data to the terminal apparatus 2 decided on in this way. The terminal apparatus 2 which receives the content data from the content introduction apparatus 3 functions as the content holding terminal apparatus by holding the content data in a memory. By this means, the content data are disposed, dispersed without bias, in the content distribution system S.

In this way, as the terminal ID, channel ID and content ID, given to the content distribution apparatus 1, terminal apparatus 2 and each item of content data, are generated by the common hash function, it is possible to think of them existing scattered, with no particular bias, in one ring-shaped ID space, as shown in FIG. 2. The figure illustrates the terminal ID and content ID given at 32 bits. In the figure, round marks indicate the terminal ID, squares the channel ID, and diamonds the content ID, and the ID's increase in a counter-clockwise direction.

1.2. Routing Table Compilation

Figure 3A:
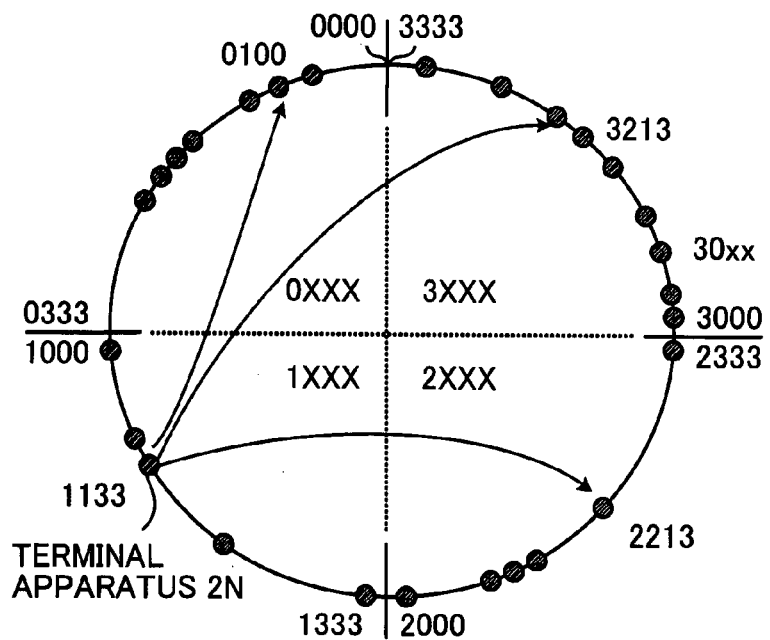
FIGS. 3A and 3B are diagrams showing one example of an aspect of a routing table compiled by a DHT.
Figure 3B:
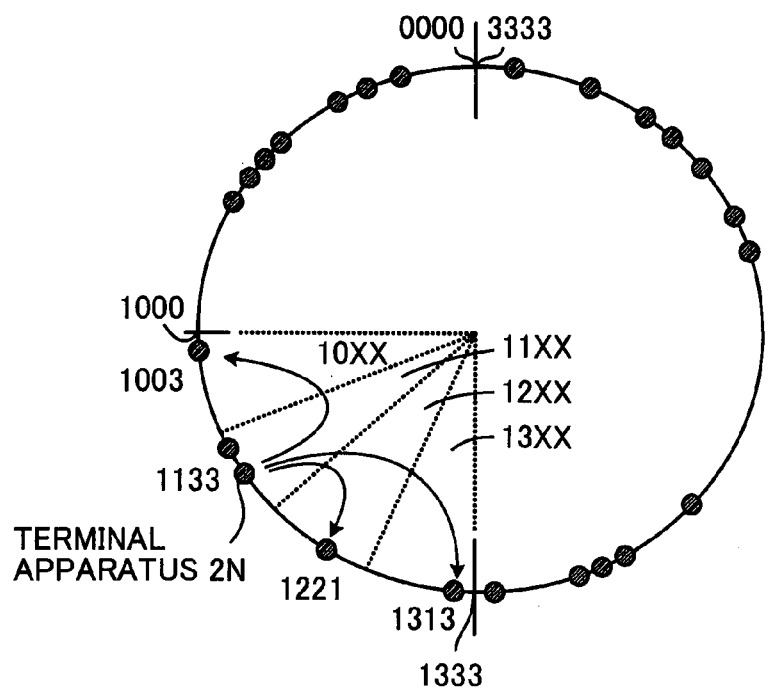

Herein, referring to FIGS. 3A and 3B, a description will be given of one example of a method of compiling a routing table used in the DHT. FIGS. 3A and 3B are diagrams showing one example of an aspect of a routing table compiled by the DHT.

Firstly, as shown in FIG. 3A, an ID space is divided into a number of areas. Although, in practice, a 16-division scale is often used, four divisions will be used here, in order to simplify the description, and ID's will be expressed in bit lengths of eight bits in base four. Then, taking the terminal ID of a terminal apparatus 2N to be "1133", a description will be given of one example of making a routing table of the terminal apparatus 2N. Although an example of making the routing table of the terminal apparatus 2 is shown here, the same applies to a routing table of the content distribution apparatus 1.

Level 1 Routing

Firstly, in the case of dividing the ID space into four, it is divided into four areas, "0XXX", "1XXX", "2XXX" and "3XXX" (X is a positive integer between 0 and 3 inclusive, the same applying hereafter), of which first digits differ when each area is expressed in base four. The terminal apparatus 2N, the terminal ID of the terminal apparatus 2N itself being "1133", exists in the area "1XXX" in a bottom left in FIG. 3A. Then, the terminal apparatus 2N appropriately selects a terminal apparatus 2 existing in an area (that is, the area "0XXX", the area "2XXX" or the area "3XXX") other than the area in which it exists itself (that is, the area "1XXX"), and stores the terminal ID location information, that is, the terminal ID IP address, in a level 1 table. FIG. 4 is one example of the level 1 table. In the table, "0100" as terminal ID of the area "0XXX", "2213" as terminal ID of the area "2XXX", and "3213" as terminal ID of the area "3XXX", each indicates a selected condition. As a second column of the level 1 shows the terminal apparatus 2N itself, it is not necessary to store the location information.

Level 2 Routing

Next, as shown in FIG. 3B, of the four areas formed by the heretofore described routing, the terminal apparatus 2N further divides the area "1XXX" in which it exists itself in four, making it into four new areas, "10XX", "11XX", "12XX" and "13XX". Then, in the same way as heretofore described, the terminal apparatus 2N appropriately selects a terminal apparatus 2 existing in an area other than the area "11XX" in which it exists itself, and stores the IP address, which is the terminal ID location information, in a level 2 table. FIG. 4 is one example of the level 2 table. In the table, "1003" as terminal ID of the area "10XX", "1221" as terminal ID of the area "12XX", and "1313" as terminal ID of the area "13XX", each indicates a selected condition. A second column of the level 2 being the area "11XX" in which the terminal apparatus 2N exists, the location information is not stored, because it is tabulated in a level 3, to be described hereafter. Also, in the event that no terminal apparatus 2 exists in the heretofore described areas, terminal ID and IP address sections are empty.

Level 3 Routing

Furthermore, of the four areas formed by the heretofore described routing, the terminal apparatus 2N further divides the area "11XX" in which it exists itself in four, making it into four new areas, "110X", "11X", "112X" and "113X". Then, in the same way as heretofore described, the terminal apparatus 2N appropriately selects a terminal apparatus 2 existing in an area other than the area "113X" in which it exists itself, and stores the IP address, which is the terminal ID location information, in a level 3 table. FIG. 4 is one example of the level 3 table. A fourth column of the level 3 being the area in which the terminal apparatus 2N exists, the IP address is not stored, because it is tabulated in a level 4, to be described hereafter. Also, in the event that no terminal apparatus exists in the heretofore described areas, the terminal ID and IP address sections are empty.

In this way, by compiling the routing table, as shown in FIG. 4, in the same way as far as the level 4, it is possible to encompass all the eight bit ID. Each time the level rises, empty spaces in the table stand out more.

All the content distribution apparatus 1 and terminal apparatus 2 individually compile and possess respective routing tables compiled in accordance with the heretofore described method. In this way, each content distribution apparatus 1 and terminal apparatus 2 having a routing table to which are correlated the terminal ID (identification information) and IP addresses (location information) of one portion of the terminal apparatus 2 and content distribution apparatus 1, among all the content distribution apparatus 1 and terminal apparatus 2 in the content distribution system S, the routing table is stored in a routing table storage module, to be described hereafter.

However, when the content distribution apparatus 1 and terminal apparatus 2 are not yet participating in the content distribution system S, they do not know the location information and the like of other apparatus which are participating in the content distribution system S. For this reason, the content distribution apparatus 1 and terminal apparatus 2, when participating in the content distribution system S, generate a routing table in the way described hereafter.

Figure 5:
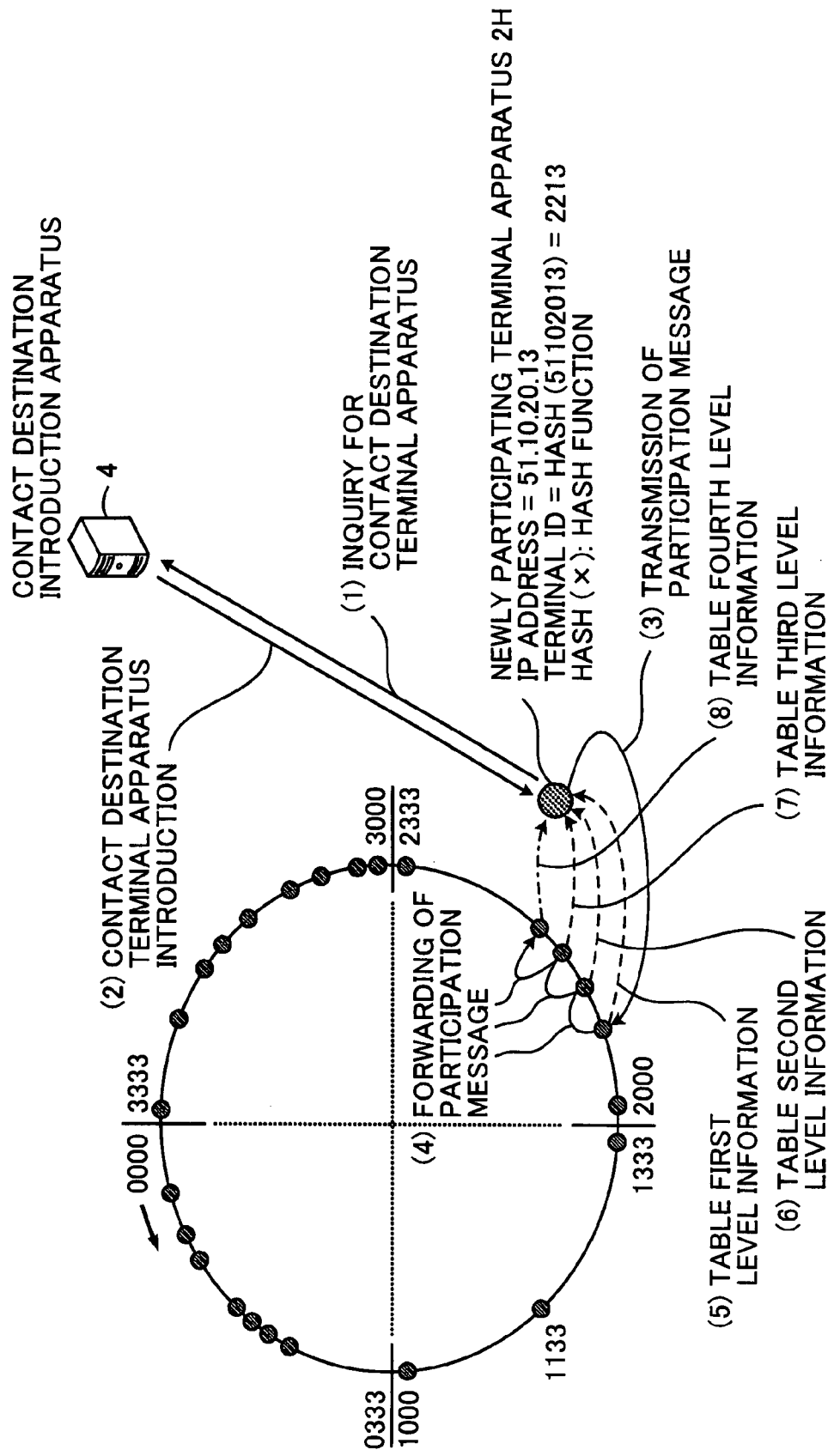
FIG. 5 is a diagram showing one example of an aspect of a terminal apparatus participating in a second distribution aspect.

FIG. 5 is a diagram showing one example of an aspect of a terminal apparatus 2H which is not yet participating in the content distribution system S (hereafter called a "newly participating terminal apparatus 2H") participating in the content distribution system S. As the same applies to the content distribution apparatus 1, a description will be given here regarding only the terminal apparatus.

Firstly, the newly participating terminal apparatus 2H, which is not yet participating in the content distribution system S, in order to participate in the content distribution system S, asks the contact destination introduction apparatus 4 for the location information of the terminal apparatus 2 to which it should transmit a participation message (hereafter called a "contact destination terminal apparatus").

The newly participating terminal apparatus 2H, on the location information of the contact destination terminal apparatus to which it should transmit the participation message being sent from the contact destination introduction apparatus 4, transmits the participation message to the contact destination terminal apparatus. Herein, destination identification information of the participation message is the terminal ID of the newly participating terminal apparatus 2H. That is, the newly participating terminal apparatus 2H, when participating in the content distribution system S, generates a participation message with the hash value "2213" of the IP address of the terminal apparatus 2 itself as the destination identification information.

The contact destination terminal apparatus, on receiving the participation message transmitted from the newly participating terminal apparatus 2H, determines whether or not the participation message is a message directed to the contact destination terminal apparatus. The determination of whether or not it is a message directed to the contact destination terminal apparatus is carried out based on the destination identification information and the routing table. Specifically, it is determined whether or not the destination identification information is near the identification information of the contact destination terminal apparatus. That is, the contact destination terminal determines, from the identification information of the terminal apparatus stored in the routing table which the contact destination terminal apparatus itself is holding, whether the terminal apparatus identification information nearest to the destination identification information is its own, or that of another terminal apparatus. Then, when the identification information of another terminal apparatus is nearer to the destination identification information than is the identification information of the contact destination terminal apparatus, the contact destination terminal apparatus which has received the participation message refers to the level 2 of the routing table which the contact destination terminal apparatus itself is holding and, as well as forwarding the participation message to, among the terminal apparatus 2 belonging to the area "2XXX", a terminal apparatus 2B of which it knows the location information, transmits the information of the level 1 table of the routing table stored in the routing table storage module of the terminal apparatus itself to the newly participating terminal apparatus 2H.

In this way, carrying out the forwarding of the participation message by a procedure of matching digits of the content ID in order from a first digit, the contact destination terminal apparatus sequentially transmits the information of each level of the routing table. When eventually arriving at the terminal apparatus 2 which is nearest to the destination identification information, the forwarding of the participation message finishes. A system which forwards a message, such as the participation message, in the heretofore described way until it arrives at an objective terminal apparatus is called a DHT routing.

In this way, the newly participating terminal apparatus 2H acquires the information of each level of the routing table, in order from the information of the top level, from the terminal apparatus 2 which has received the participation message. By so doing, the newly participating terminal apparatus 2H generates the routing table necessary in order to participate in the content distribution system S.

1.3. Content Data Distribution Aspect in Hierarchical Structure

Next, a description will be given of the content data distribution aspect in the hierarchical structure in the content distribution system S. The hierarchical structure is formed by the content distribution apparatus 1 carrying out a channel registration in the connection management terminal apparatus, a terminal apparatus attempting to participate in the channel asking the connection management terminal apparatus for a connection destination candidate, and the terminal apparatus connecting to the connection destination candidate. Hereafter, descriptions will be given of a content distribution apparatus 1 registration process, and a process of the terminal apparatus 2 participating in the hierarchical structure, in that order.

Content Distribution Apparatus 1 Registration Process

Firstly, a description will be given of a process whereby the content distribution apparatus 1, using the DHT routing, carries out a registration in the connection management terminal apparatus of a channel which stream-distributes content data.

The content distribution apparatus 1 generates a terminal ID by hashing the IP address with the predetermined hash function. Also, the content distribution apparatus 1 generates a channel ID by hashing a keyword, such as a name of the channel which stream-distributes the content data, with a hash function the same as the hash function when generating the terminal ID. Herein, the content distribution apparatus 1 terminal ID is taken to be "0211", and the channel ID "2202".

Figure 6:
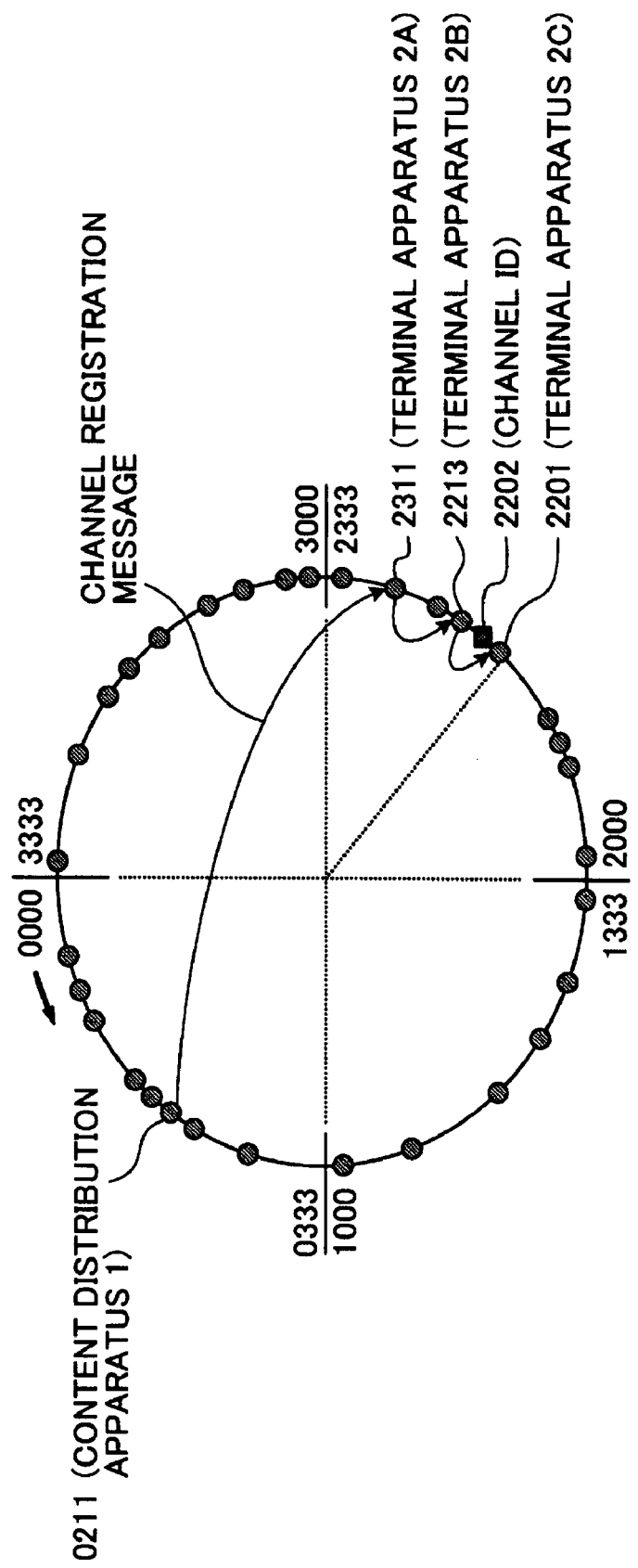
FIG. 6 is a diagram showing one example of an aspect of a channel in which a content distribution apparatus distributes being registered in a connection management terminal apparatus, using a DHT routing.

The content distribution apparatus 1, as shown in FIG. 6, referring to the level 1 table of the routing table it is holding itself, transmits a channel registration message showing the location information of the content distribution apparatus 1 itself, with the terminal ID of a terminal apparatus having a terminal ID in the same area as the channel ID "2202" as a transmission destination apparatus, and the channel ID "2202" as the destination identification information. That is, the content ID "2202" being in the area "2XXX", the content distribution apparatus 1 transmits the channel registration message to, among the terminal apparatus 2 belonging to the area "2XXX", a terminal apparatus 2A (terminal ID "2311"), of which it knows the location information (that is, of which the location information is stored in the routing table it is holding itself). As information included (described) in the channel registration message, there is the channel ID corresponding to the channel to which the registration is requested, the location information of the content distribution apparatus 1, a quantity of downstream terminal apparatus 2 to which the content distribution apparatus 1 can connect (hereafter taken to be an "allowable downstream quantity"), and the like.

Next, the terminal apparatus 2A which has received the channel registration message determines whether or not the channel registration message is a message directed to the terminal apparatus 2A itself. The determination of whether or not it is a message directed to the terminal apparatus 2A itself is carried out based on the destination identification information and the routing table. Specifically, it is determined whether or not the destination identification information is near the identification information of the terminal apparatus 2A itself. That is, the terminal apparatus 2A itself determines, from the identification information of the terminal apparatus stored in the routing table which the terminal apparatus 2A itself is holding, whether the terminal apparatus identification information nearest to the destination identification information is its own, or that of another terminal apparatus. Herein, as the identification information of another-terminal apparatus is nearer to the destination identification information than is the identification information of the terminal apparatus 2A itself, the terminal apparatus 2A, referring to the level 2 table of the routing table which the terminal apparatus 2A itself is holding, forwards the channel registration message to, among the terminal apparatus 2 belonging to the area "22XX", the terminal apparatus 2B (terminal ID "2213"), of which it knows the location information.

In this way, the forwarding of the channel registration message proceeding by a procedure of matching digits of the channel ID in order from a first digit, on eventually arriving at a terminal apparatus 2C (terminal ID "2201") which manages the hierarchical structure of the channel corresponding to the channel ID, that is, the channel ID "2202" connection management terminal apparatus, the connection management terminal apparatus newly generates a table of connection condition information (hereafter taken to be a "connection condition information table") of a tree-shaped hierarchical structure corresponding to the channel ID "2202" included in the channel registration message, and stores it in a connection condition information storage module, to be described hereafter. For example, the channel ID "2202" connection condition information table shown in FIG. 7 being newly stored in the connection condition information storage module when the channel ID included in the channel registration message is "2202", when the IP address, which is the location information of the content distribution apparatus 1, is "92.111.223.76", and the allowable downstream quantity is "2", these are stored in the channel ID "2202" connection condition information table as the channel ID "2202" connection condition information.

Terminal Apparatus 2 Hierarchical Structure Participation Process

Figure 8:
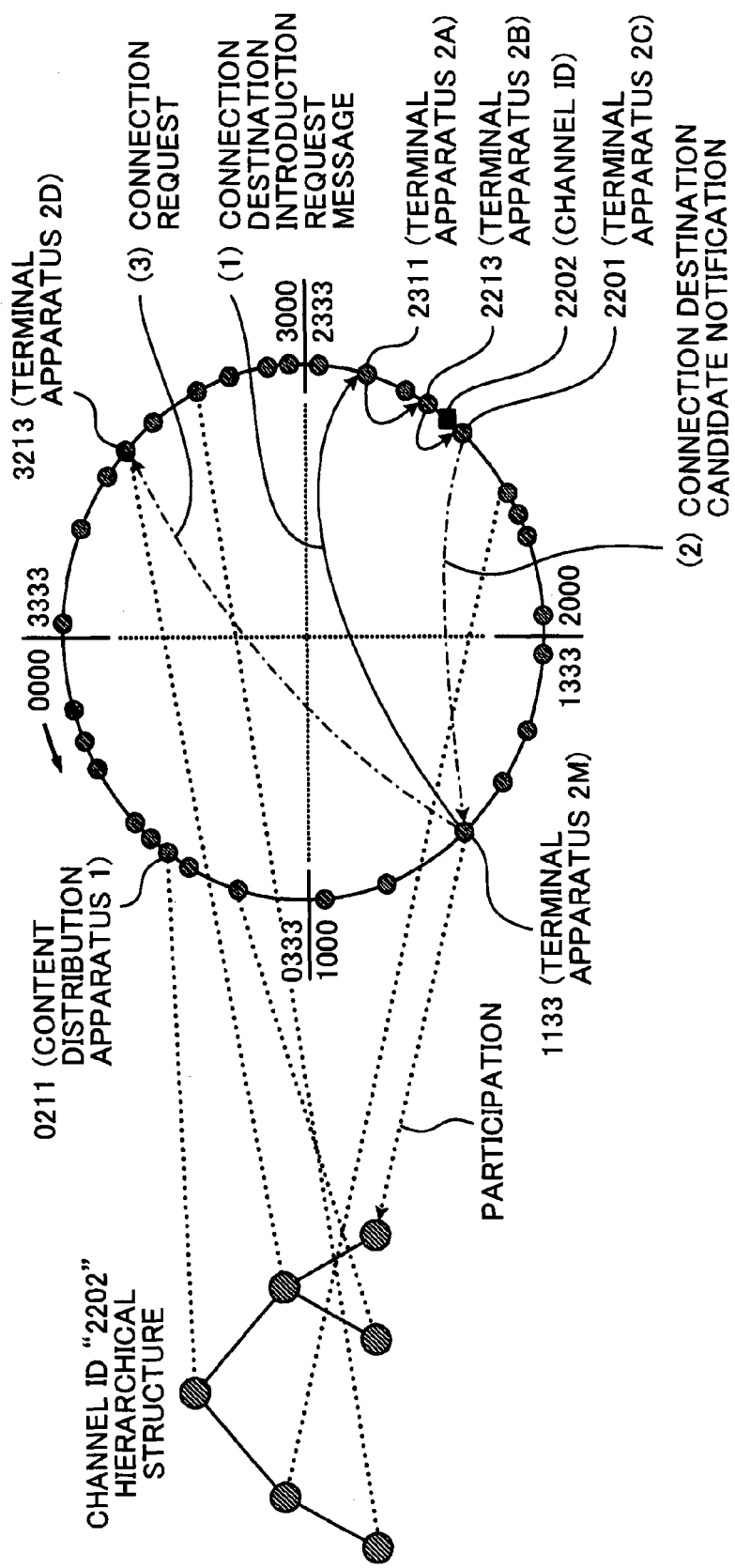
FIG. 8 is a diagram showing one example of an aspect of a terminal apparatus participating in a hierarchical structure of the channel in which the content distribution apparatus distributes, using the DHT routing.

Next, referring to FIG. 8, a description will be given of one example of a method of a terminal apparatus participating in the hierarchical structure of a channel. FIG. 8 is a diagram showing one example of an aspect of the terminal apparatus 2, using the DHT routing, searching for the connection management terminal apparatus which manages the hierarchical structure of a certain channel, and participating in the hierarchical structure of the channel. Herein, a description will be given of a procedure when a terminal apparatus 2M, with terminal ID "1133", participates in the hierarchical structure with the channel ID "2202". A terminal apparatus which, in the way described hereafter, searches for the connection management terminal apparatus, and asks for information on a connection destination candidate in the hierarchical structure of a certain channel (hereafter, including the information on the connection destination candidate, this may be abbreviated to "connection destination candidate"), is called a "connection request terminal apparatus".

The connection request terminal apparatus 2M, as shown in FIG. 8, based on the routing table the terminal apparatus 2 itself is holding, transmits a connection destination introduction request message for connecting to the connection destination candidate for the hierarchical structure with the channel ID "2202", with the terminal ID of a terminal apparatus having a terminal ID in the same area as the channel ID "2202" as an address, and the channel ID "2202" as the destination identification information. The connection destination introduction request message is a request for an introduction of a connection destination candidate, which is a terminal apparatus, among the apparatus configuring the hierarchical structure with the channel ID "2202", to which it is possible to connect. Then, the connection destination introduction request message too, in the same way as the heretofore described channel registration message, being repeatedly forwarded in accordance with the routing table, on eventually arriving at the terminal apparatus 2C (terminal ID "2201") which manages the hierarchical structure of the channel corresponding to the channel ID, that is, the channel ID "2202" connection management terminal apparatus 2C, the connection management terminal apparatus returns the location information and the like of the apparatus (the content distribution apparatus 1 or a terminal apparatus 2) which is to be the connection destination candidate, from the connection condition information table corresponding to the channel ID "2202" included in the connection destination introduction request message, to the connection request terminal apparatus 2M. Specifically, the connection management terminal apparatus 2C retrieves the location information of a number of apparatus, as connection destination candidates, from apparatus to which a quantity of terminal apparatus which can be connected downstream (hereafter taken to be a "downstream unconnected quantity") is one or more, and notifies the connection request terminal apparatus 2M. For example, in the event that the connection condition information corresponding to the channel ID "2201" is in the kind of condition shown in FIG. 7, the connection management terminal apparatus retrieves an IP address "31.120.10.23", which is the location information of a terminal apparatus 2D stored under a registration number 2 of the connection condition information table, and returns it to the connection request terminal apparatus 2M.

The connection request terminal apparatus 2M, on receiving the location information of the connection destination candidate (the terminal apparatus 2D) from the connection management terminal apparatus 2C, requests a connection by transmitting a connection request message to the connection destination candidate apparatus (hereafter taken to be a "connection destination apparatus"), with the location information as an address, by which means the connection request terminal apparatus 2M is embedded in the hierarchical structure of the channel in which it wishes to participate. Then, in the connection request terminal apparatus 2M, it becomes possible to receive, directly or via another terminal apparatus 2, the content data distributed from the content distribution apparatus 1.

Also, the connection request terminal apparatus 2M which has joined the hierarchical structure of the channel corresponding to the channel ID "2201" transmits a connection condition information message. The connection management terminal apparatus 2C, on receiving the connection condition information message, updates the connection condition information corresponding to the channel ID "2201" in accordance with the connection condition information message. Herein, the IP address which is the location information of the connection request terminal apparatus 2M, the IP address which is the location information of the connection destination candidate to which the connection request terminal apparatus 2M has connected, a quantity of apparatus to which it is possible to connect downstream of the connection request terminal apparatus 2M, and the like, being included in the connection condition information message transmitted from the connection request terminal apparatus 2M, the connection management terminal apparatus 2C adds a new registration number to the connection condition information table, and registers the IP address and allowable downstream quantity of the connection request terminal apparatus 2M, correlated to the registration number. Also, the connection management terminal apparatus 2C extracts, from the connection condition information table, a registration number corresponding to the IP address of the connection destination candidate to which the connection request terminal apparatus 2M has connected and, taking the number to be the number of the downstream apparatus, stores it in the connection condition information table, correlated to the registration number of the connection request terminal apparatus 2M.

In this way, in the content distribution system S, by the terminal apparatus 2 participating one after the other in each channel in this way, the plurality of terminal apparatus 2 are logically connected in multilayers in the tree-shaped hierarchical structure, with the content distribution apparatus 1 as the apex. Then, the content data distributed from the content distribution apparatus 1 are sequentially relayed to the downstream terminal apparatus 2 by the relay function of the terminal apparatus 2, and stream-distributed to the plurality of terminal apparatus 2.

That is, a distribution module which stream-distributes content data via the network 6 being provided in the content distribution apparatus 1, content data being transmitted from the content distribution apparatus 1 to the terminal apparatus 2a1 and 2a2 (first layer terminal apparatus), on the terminal apparatus 2a1 and 2a2 receiving the content data, they sequentially relay the content data received to the downstream terminal apparatus 2b1 to 2b4 (second layer terminal apparatus), as shown in FIG. 1. On the terminal apparatus 2b1 to 2b4 receiving the content data, they sequentially relay the content data received to the downstream terminal apparatus 2c1 to 2c8 (third layer terminal apparatus). In FIG. 1, in order to facilitate understanding, the hierarchical structure of only one channel, among the plurality of channels, is represented.

The terminal apparatus 2 stores the location information of the terminal apparatus 2 upstream of its position in the hierarchical structure in which it is embedded, or of the content distribution apparatus 1, and the location information of the terminal apparatus 2 downstream of its position in the hierarchical structure in which it is embedded, in a hard disc device 203, to be described hereafter, and carries out the relay of the content data based on the location information stored in this way. Also, the distributed content data being sequentially distributed divided into a plurality of packets, the data distributed divided into packets in this way are called content packets.

The content data distributed to the terminal apparatus 2 are distributed in each channel to the terminal apparatus 2 configuring its hierarchical structure. As well as content data such as music or a movie, reproduction time information is included in the distributed content data. Then, the plurality of terminal apparatus 2 which have received the content data carry out a reproduction of the sequentially transmitted content data based on the reproduction time information.

1.4. Content Data Distribution Aspect at Download Request

Next, a description will be given of the content data distribution aspect at a download request in the content distribution system S. Content data distributed in the distribution aspect at a download request being introduced to the terminal apparatus 2 by the content introduction apparatus 3, as heretofore described, the terminal apparatus 2 to which the content data are introduced becomes the content holding terminal apparatus, and discloses new content data in such a way as to be visible to other terminal apparatus 2 in the content distribution system S. The content data disclosed in this way are searched for by the terminal apparatus 2 in the content distribution system S, using the DHT routing, and downloaded. Hereafter, a specific description will be given.

Method of Registering in Index Table

Firstly, a description will be given of a method when disclosing new, downloadable content data in the content distribution system S in such a way as to be visible to other terminal apparatus 2 in the content distribution system S.

Figure 9:
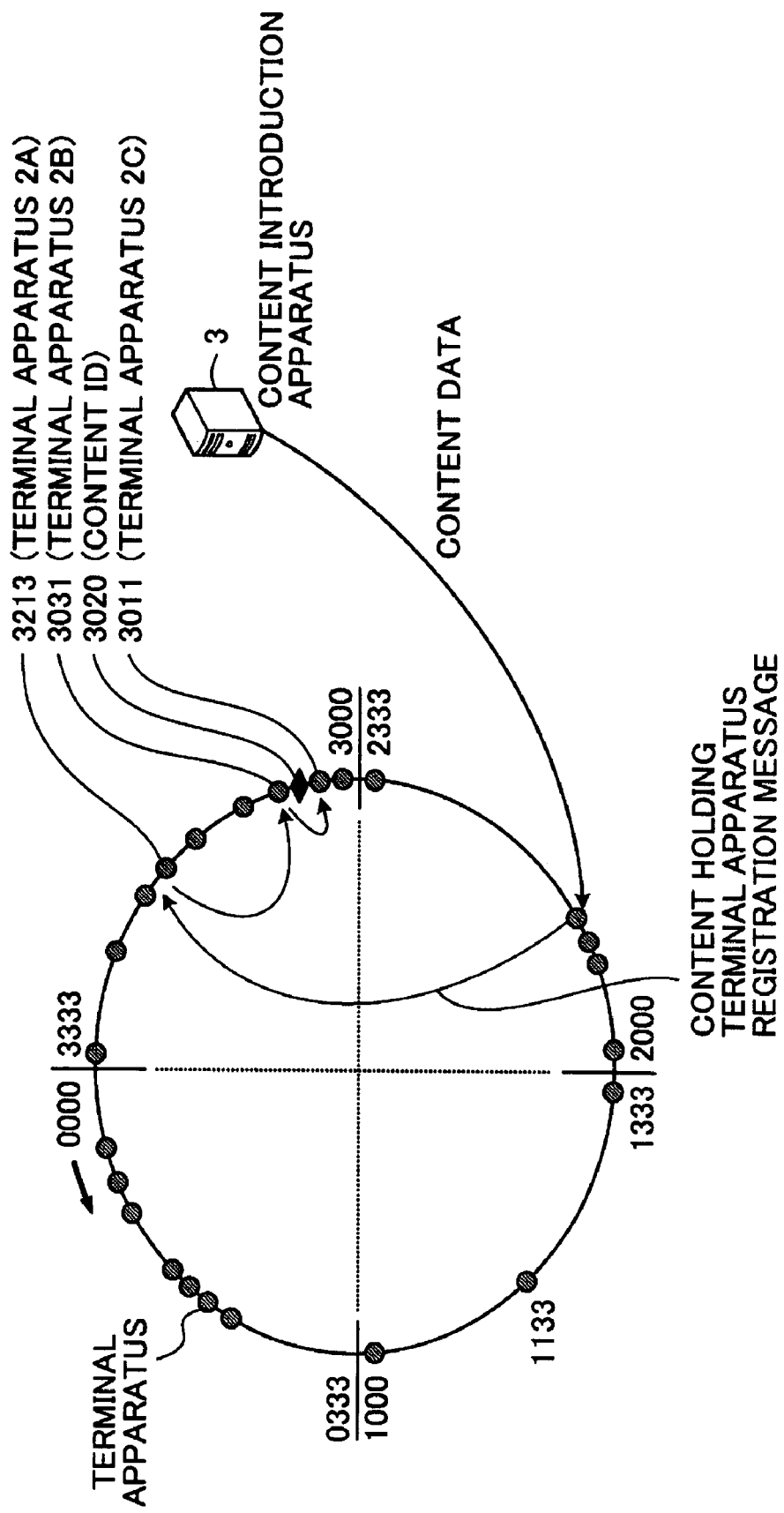
FIG. 9 is a diagram showing one example of an aspect of content data being held in a terminal apparatus, using the DHT routing.

As shown in FIG. 9, the content holding terminal apparatus to which the content data have been distributed from the content introduction apparatus 3 transmits a content holding terminal apparatus information registration request message (hereafter called a "content holding terminal apparatus registration message"), including the location information and identification information of the content holding terminal apparatus, toward a terminal apparatus which has a terminal ID the same as the content ID calculated from the content name and the like (it is not known at this point whether or not this terminal apparatus actually exists). Then, the content holding terminal apparatus registration message too, in the same way as the heretofore described channel registration message, being repeatedly forwarded in accordance with the routing table, when it has been forwarded as far as the terminal apparatus 2 which has the terminal ID nearest to the content ID included in the content holding terminal apparatus registration message, in the event that the terminal apparatus 2 determines that there is no longer any other terminal apparatus which is a transmission destination, it determines that the terminal apparatus 2 itself should become the root terminal apparatus of the content and, as shown in FIG. 10, stores the content ID, the content holding terminal apparatus location information, and the like, which is the content holding terminal apparatus information included in the content holding terminal apparatus registration message, as index information in an index table 222, to be described hereafter. Herein, "the root terminal apparatus of the content" is a terminal apparatus which manages the location information of the content holding terminal apparatus holding the content data with the content ID nearest to the terminal ID of the terminal apparatus itself.

On the IP address, which is the content holding terminal apparatus location information, being registered in the index table 222 of the root terminal apparatus in this way, it becomes possible for the terminal apparatus 2 to search for the content data, and request a reception of the content data. A terminal apparatus which searches for the content data, and requests a reception of the content data, in this way is called a "request terminal apparatus". In this way, in the embodiment, by registering the content distributed from the content introduction apparatus 3 in the content holding terminal apparatus, and arranging in such a way that it can be searched for via the root terminal apparatus, the content is disclosed to other terminal apparatus. A terminal apparatus which is not the root terminal apparatus too, on receiving a content holding terminal apparatus registration message, stores the information included in the content holding terminal apparatus registration message in the index table 222.

The index table 222, as shown in FIG. 10, is a table for storing the content holding terminal apparatus information, including the IP address, which is the content holding terminal apparatus location information, and the like. As well as the content holding terminal apparatus location information, a time at which the content holding terminal apparatus has been introduced, and the like, is stored as the content holding terminal apparatus information on each line (predetermined storage area) in the index table 222.

Content Data Search Method

Figure 11:
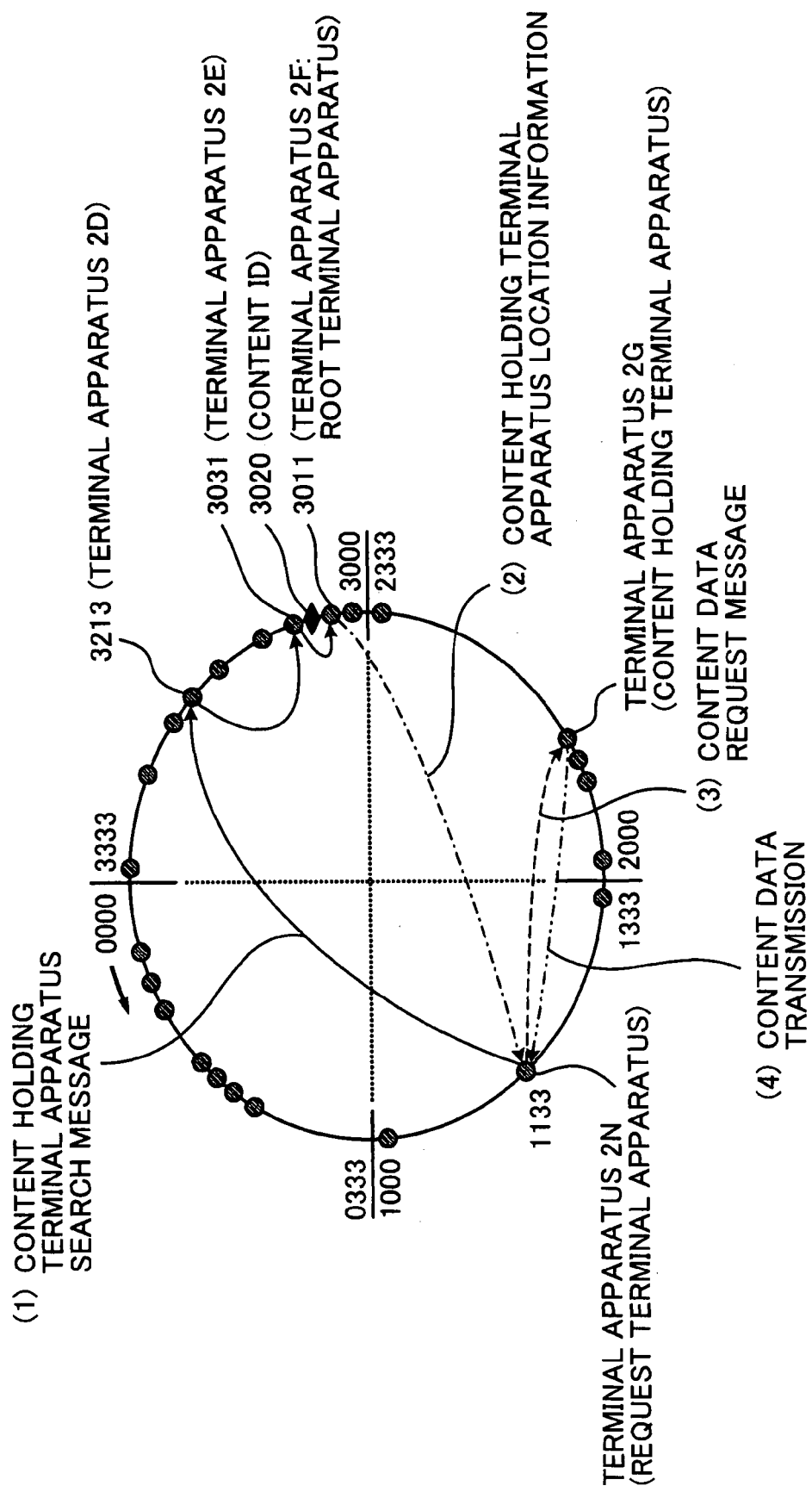
FIG. 11 is a diagram showing one example of an aspect of a terminal apparatus downloading, using the DHT routing.

Next, referring to FIG. 11, a description will be given of one example of a method of searching for a content holding terminal apparatus holding content data. FIG. 11 is a diagram showing one example of an aspect of a content holding terminal apparatus being searched for using the DHT routing.

Herein, a description will be given of a procedure when the terminal apparatus 2N with the terminal ID "1133", as the request terminal apparatus, searches for content data having a content ID "3020".

The request terminal apparatus 2N, as shown in FIG. 11, transmits a request (hereafter called a "content holding terminal apparatus search message") for a transmission of content holding terminal apparatus information (information including the location information of the content holding terminal apparatus), with the terminal ID of a terminal apparatus having a terminal ID in the same area as the content ID "3020" as an address, and the content ID "3020" as the destination identification information. Then, the content holding terminal apparatus search message too, in the same way as the heretofore described channel registration message, being repeatedly forwarded in accordance with the routing table, on eventually arriving at a terminal apparatus 2F (terminal ID "3011") which manages the content data, that is, the root terminal apparatus, the root terminal apparatus searches for the content ID "3020" included in the content holding terminal apparatus search message from among index information, to be described hereafter, which it manages itself, and returns the location information and the like of the content holding terminal apparatus which possesses the content data (herein, taken to be a terminal apparatus 2G) to the request terminal apparatus 2N.

The request terminal apparatus 2N becomes aware of the location information of the content data with the content ID "3020", that is, the IP address of the content holding terminal apparatus 2G which holds the content data with the content ID "3020", by receiving it from the root terminal apparatus 2F and, by transmitting a content data request message to the content ID "3020" content holding terminal apparatus 2G, asking for the content data, acquires the content data by downloading them from the content holding terminal apparatus 2G.

2. Description of Configuration and the like of Content Distribution Apparatus 1

Next, referring to FIG. 12, a more detailed description will be given of a configuration and operations of the content distribution apparatus 1. Although the content distribution apparatus 1, in addition to the configuration and operations shown hereafter, can also carry out the same kinds of operation as the operations in the terminal apparatus 2, as those configuration and operations are the same as the configuration and operations of the terminal apparatus 2, which will be described in detail hereafter, portions which are the same as the terminal apparatus 2 will be omitted.

Figure 12:
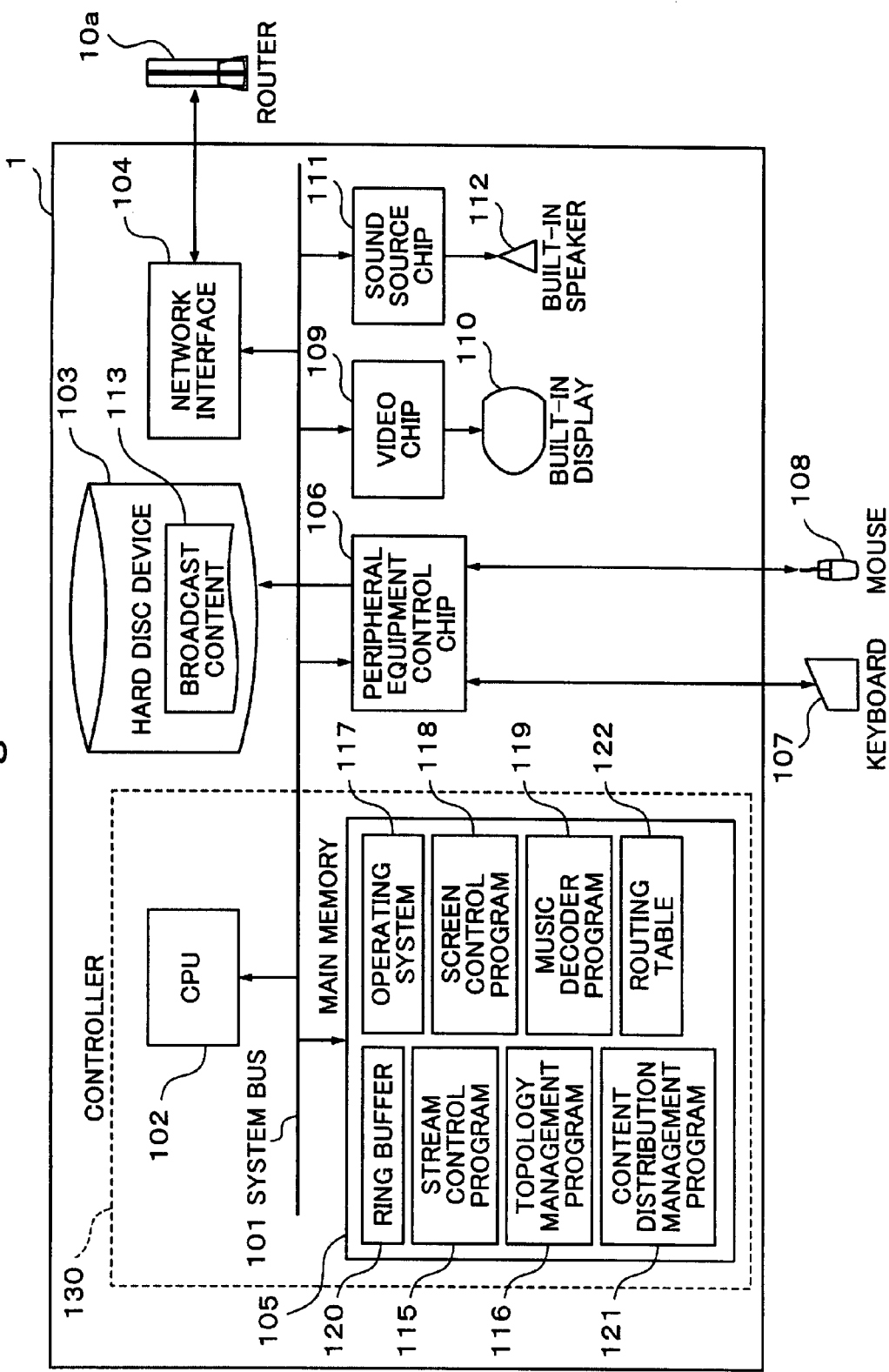
FIG. 12 is a diagram showing an example of an outline configuration of the content distribution apparatus of FIG. 1.

FIG. 12 is a diagram showing an example of an outline configuration of the content distribution apparatus 1 in the embodiment. The content distribution apparatus 1, a general server computer being applicable, being configured, as shown in FIG. 12, including a CPU (Central Processing Unit) 102, a main memory 105, as a rewritable main storage device which stores various kinds of program and the like, a hard disc device 103, which stores various kinds of data and the like, a network interface 104, which carries out communication with the terminal apparatus 2 and the content introduction apparatus 3 via the network 6, a peripheral equipment control chip 106, which controls an input module, such as a keyboard 107 or a mouse 108, which can input predetermined information, a video chip 109 which receives image data from the CPU 102 and, as well as writing them into an internal video memory (not shown), displays the data written into the video memory on a built-in display 110, to be described hereafter, the built-in display 110, which carries out a display corresponding to a signal transmitted from the video chip 109, a sound source chip 111, which has a sound source such as an FM (Frequency Modulation) sound source or a Wave Table sound source, and a built-in speaker 112, which converts an audio signal transmitted from the sound source chip 111 into a sound wave, these various kinds of component are mutually connected via a system bus 101. The network interface 104 is connected to the network 6 via a router 10a. The router 10a corresponds to the router 10 shown in FIG. 1.

In the embodiment, a controller 130 is configured of the CPU 102 and the main memory 105. Also, the built-in display (a liquid crystal display or the like) 110, and the like, being incorporated into the content distribution apparatus 1, as heretofore described, it is possible, for example, for a broadcast operator who operates the content distribution system S to input predetermined information from the input module while looking at the built-in display 110. In the embodiment, the built-in display 110, built-in speaker 112, and the like, are incorporated into the content distribution apparatus 1 but, not being limited to this, it is also acceptable, for example, that they are connected separately.

Main Memory 105

An OS (operating system) program 117 for providing basic functions of the content distribution apparatus 1 as a computer, a stream control program 115 for retrieving content data stored in a broadcast content storage area of the hard disc device 103, and stream-distributing them to the terminal apparatus 2, a topology management program 116 for carrying out a management, or the like, of the location information (IP address) of each terminal apparatus 2 connected downstream of its own content distribution apparatus 1, a screen control program 118 for controlling the built-in display 110, a music decoder program 119 for decoding encoded music content data, a content distribution management program 121 for registering a channel of its own content distribution apparatus 1 in the terminal apparatus 2 which is the connection management terminal apparatus of the channel, and carrying out a transmission and reception of messages based on the routing table, to be described hereafter, and the like being stored in the main memory 105, they are retrieved by the CPU 102, and functions according to the programs are executed by the CPU 102. Also, a ring buffer area 120, which temporarily stores content data, retrieved from broadcast content data 113 stored in the hard disc device 103, before they are transmitted to the terminal apparatus 2, and a routing table storage area (corresponding to one example of the routing table storage module), which stores the routing table 122 (refer to FIG. 4) for carrying out the DHT routing, are provided in the main memory 105.

Herein, the OS program 117, by being retrieved and executed by the CPU 102, renders executable functions relating to an input-output of the keyboard 107 or the mouse 108, and the basic functions of the computer, which is the content distribution apparatus 1, such as a memory management of the main memory 105, the hard disc device 103, and the like.

Then, in a condition in which the OS program 117 is executed by the CPU 102, the heretofore described stream control program 115, topology management program 116, screen control program 118, music decoder program 119, and content distribution management program 121, are retrieved from the main memory 105, and executed.

It is also acceptable that the OS program 117, stream control program 115, topology management program 116, screen control program 118, music decoder program 119, content distribution management program 121, and the like are, for example, downloaded into the main memory 105 from a server, or the like, connected to the network 6, and it is also acceptable that, after being recorded on a recording medium such as a CD-ROM, they are loaded into the main memory 105 via the recording medium.

Controller 130

The controller 130, being configured, as heretofore described, of the CPU 102 and main memory 105, centrally controls a whole of the content distribution apparatus 1 by the CPU 102 retrieving and executing the various kinds of program 115 to 119, and 121, stored in the main memory 105, as well as functioning as a content data distribution module, a topology management module, a reproduction module, a routing table generation module, a channel registration message transmission process module, a connection request message reception module, a message destination determination module, a message forwarding module, a display control module, a channel information transmission module, and the like, to be described hereafter. The controller 130 functions as the content data distribution module, and the like, by the CPU 102 executing the stream control program 115, also, as the topology management module by the CPU 102 executing the topology management program 116, also, as the display control module, and the like, by the CPU 102 executing the screen control program 118, also, as the reproduction module by the CPU 102 executing the music decoder program 119, and also, as the routing table generation module, the channel registration message transmission process module, the connection request message reception module, the message destination determination module, the message forwarding module, the display control module, the channel information transmission module, and the like, by the CPU 102 executing the content distribution management program 121. Furthermore, the hard disc device 103 is used as a content data storage module in which content data are stored.

Routing Table Generation Module

The routing table generation module asks the contact destination introduction apparatus 4 for, and acquires, the location information of the contact destination terminal apparatus to which it should transmit a participation message. Then, the routing table generation module transmits the participation message to the contact destination terminal apparatus, and generates a routing table based on the location information and identification information of other terminal apparatus transmitted from the contact destination terminal apparatus in response to the participation message (refer to FIG. 5).

Channel Registration Message Transmission Process Module

The channel registration message transmission process module, based on the routing table 122, transmits a channel registration message including the location information of its own content distribution apparatus 1, with the channel ID indicating the channel in which its own content distribution apparatus 1 stream-distributes content data as the destination identification information.

Subsequently, the channel registration message transmission process module regularly transmits a channel registration message. For this reason, even in the event that a change in location information occurs in the content distribution apparatus, it is possible to easily carry out the change process in the terminal apparatus which manages the channel connection condition.

Connection Request Message Reception Module

The connection request message reception module, on receiving a connection request message from the terminal apparatus 2 requesting a connection to the hierarchical structure of the channel of its own content distribution apparatus 1, makes a logical connection with the terminal apparatus 2 which has transmitted the message, from when on a distribution of content data is carried out, by means of the content data distribution module, to the logically connected terminal apparatus.

Content Data Distribution Module

The content data distribution module stream-distributes the content data via the network 6. That is, the content data distribution module retrieves broadcast content data stored in the hard disc device 103, and stream-distributes them, via the network 6, to the logically connected terminal apparatus 2 (for example, in the event of being connected in a tree shape, a top layer terminal apparatus), or the like.

The stream distribution to the terminal apparatus 2, or the like, by the content data distribution module is executed according to the following procedure.

The content data distribution module, based on broadcast program information, sequentially retrieves content data from the broadcast content data 113 stored in advance in the hard disc device 103, and stores them in the ring buffer area 120.

Subsequently, the content data distribution module stores the content data stored in the ring buffer area 120 in content packets, while dividing them into predetermined amounts, and transmits the content packets, via the network 6, to the connected terminal apparatus 2, and the like.

Topology Management Module

Channel ID being allotted to the channel which the content distribution apparatus 1 broadcasts, the topology management module manages the location information (IP address) of the terminal apparatus 2 participating in a first level of the tree-shaped hierarchical structure configured by the allotted terminal ID. Then, the heretofore described distribution module distributes the content data to the terminal apparatus 2, with the IP address of the terminal apparatus 2 which the topology management module manages as a destination address, and a distribution IP address as a transmission source.

Message Destination Determination Module

The message destination determination module, based on the destination identification information of the message received via the network 6, and on the routing table, determines whether or not the received message is addressed to its own content distribution apparatus 1.

The determination of whether or not the received message is addressed to its own content distribution apparatus 1 is carried out by retrieving the destination terminal ID (destination identification information) included in the message, and is based on the routing table stored in the main memory 105. That is, when receiving the various kinds of message via the network interface 104, the message destination determination module compares the destination identification information included in the received message with the terminal ID stored in the routing table 122 and, in the event that it determines that the terminal ID in the routing table 122 which is nearest to the destination identification information included in the message is the terminal ID of its own content distribution apparatus 1, determines that it is a message addressed to its own content distribution apparatus 1.

Message Forwarding Module

In the event that it is determined, by the message destination determination module, that the message received via the network 6 is not addressed to its own content distribution apparatus, the message forwarding module, based on the destination identification information of the received message, retrieves the location information of a forwarding destination terminal apparatus from the routing table 122, and forwards the received message to the forwarding destination terminal apparatus.

Display Control Module

The display control module, controlling the video chip 109 and built-in display 110, has a function of displaying content data and various kinds of information. That is, the display control module can control in what way a content image and the various kinds of information are displayed on the built-in display 110.

Reproduction Module

The reproduction module has a function of displaying content data, from among the broadcast content data 113, on the built-in display 110, or transmitting them from the built-in speaker 112.

Channel Information Transmission Module

The channel information transmission module transmits, to the contact destination introduction apparatus 4, details of content (hereafter called "channel information") stream-distributed from its own content distribution apparatus 1 for a predetermined period (for example, one day or one week). The channel ID of the channel in which its own content distribution apparatus 1 stream-distributes, and content data details, are included in the channel information. The contact destination introduction apparatus 4 generates an electronic program guide (EPG) based on the channel information, making it transmittable to the terminal apparatus 2.

3. Description of Configuration and the like of Terminal Apparatus 2

Figure 13:
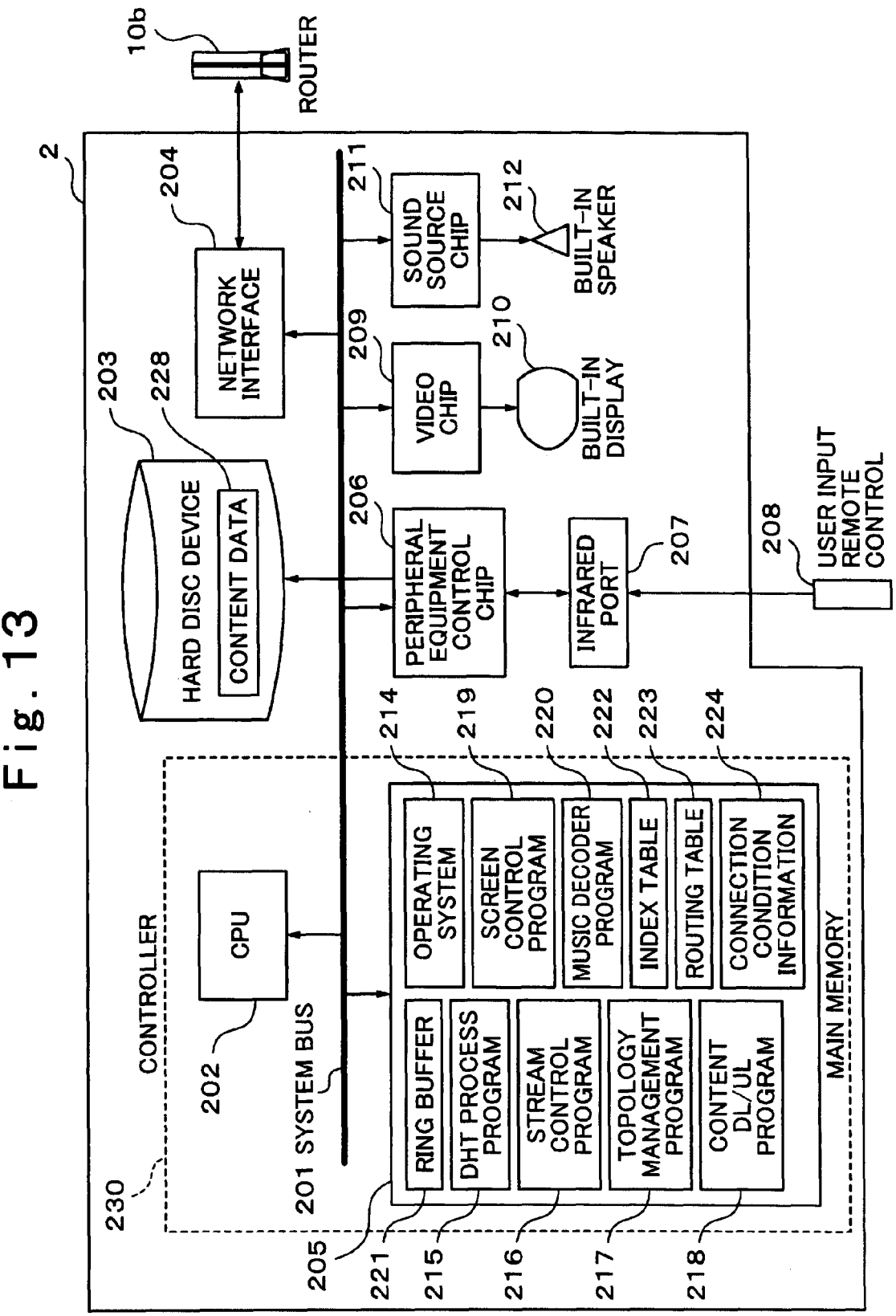
FIG. 13 is a diagram showing an example of an outline configuration of the terminal apparatus of FIG. 1.

Next, referring to FIG. 13, a more detailed description will be given of a configuration and operations of the terminal apparatus 2. FIG. 13 is a diagram showing an example of an outline configuration of the terminal apparatus 2 in the embodiment.

The terminal apparatus 2, a general personal computer or a dedicated terminal being applicable, being configured, as shown in FIG. 13, including a CPU (Central Processing Unit) 202, a rewritable main memory 205, which stores various kinds of program and the like, a hard disc device 203, which stores various kinds of data and the like, a network interface 204 for carrying out an online communication, by means of a wire communication, with the content distribution apparatus 1, other terminal apparatus 2, the content introduction apparatus 3, and the contact destination introduction apparatus 4, via the network 6, a user input remote control 208, which transmits and receives a predetermined infrared signal enabling a remote operation by the user of the terminal apparatus 2, an infrared port 207 for carrying out communication using the user input remote control 208 and infrared rays, a peripheral equipment control chip 206 which controls the infrared port 207, a video chip 209 which receives image data from the CPU 202 and, as well as writing them into an internal video memory (not shown), displays the data written into the video memory on a built-in display 210, to be described hereafter, the built-in display 210, which carries out a display corresponding to a signal transmitted from the video chip 209, a sound source chip 211, which has a sound source such as an FM (Frequency Modulation) sound source or a Wave Table sound source, and a built-in speaker 212, which converts an audio signal transmitted from the sound source chip 211 into a sound wave, these various kinds of component are mutually connected via a system bus 201. In the embodiment, a controller 230 is configured of the CPU 202 and the main memory 205. Also, the network interface 204 is connected to the network 6 via a router 10b. The router 10b corresponds to the router 10 shown in FIG. 1.

Main Memory 205

An OS program 214 for providing basic functions of the terminal apparatus 2 as a computer, a DHT process program 215 which participates in the content distribution system S, and processes various kinds of messages, a stream control program 216 for participating in the content data distribution aspect in the hierarchical structure, stream-receiving content data stream-distributed from the content distribution apparatus 1, directly or relayed by other terminal apparatus 2, and stream-transmitting (relaying) them to the downstream terminal apparatus 2, a topology management program 217 for, in the content data distribution aspect in the hierarchical structure, carrying out a management, or the like, of the location information (IP address) of the terminal apparatus 2 (or the content distribution apparatus 1) connected in the tree one layer upstream, and the location information of the terminal apparatus 2 connected in the tree one layer downstream, a content download-upload program 218 (hereafter taken to be a "content DL/UL program") for, in the content data distribution aspect at a download request, downloading and uploading content data, a screen control program 219 for controlling the built-in display 210, a music decoder program 220 for, in the content data distribution aspect in the hierarchical structure, decoding and stream-reproducing content data stream-received from the upstream apparatus and, in the content data distribution aspect at a download request, and the like being stored in the main memory 205, they are retrieved by the CPU 202, and functions according to the programs are executed by the CPU 202.

Also, a ring buffer area 221, which has a predetermined storage capacity, and sequentially temporarily stores stream-received content data, an index table storage area (corresponding to one example of a content holding terminal apparatus information storage module) for storing the index table 222 (refer to FIG. 10), a routing table storage area (corresponding to one example of a routing table storage module) for storing a routing table 223 (refer to FIG. 4), a connection condition information storage area 224 (corresponding to one example of a connection condition information storage module), which stores a connection condition information table storing channel connection condition information when its own terminal apparatus 2 becomes the connection management apparatus, and the like, are further provided in the main memory 205.

Herein, the OS program 214, by being retrieved and executed by the CPU 202, renders executable functions relating to an input-output of the user input remote control 208, and the basic functions of the computer, which is the terminal apparatus 2, such as a memory management of the main memory 205, the hard disc device 203, and the like. Then, in a condition in which the OS program 214 is executed by the CPU 202, the heretofore described DHT process program 215, stream control program 216, topology management program 217, content DL/UL program 218, screen control program 219, music decoder program 220, and the like, are retrieved from the main memory 205, and executed.

It is also acceptable that the OS program 214, DHT process program 215, stream control program 216, topology management program 217, content DL/UL program 218, screen control program 219, music decoder program 220, and the like are, for example, downloaded into the main memory 205 from a server, or the like, connected to the network 6, and it is also acceptable that, after being recorded on a recording medium such as a CD-ROM, they are loaded into the main memory 205 via a drive of the recording medium.

Hard Disc Device 203

A content data storage area 228 (corresponding to one example of a content data storage module), which stores content data introduced by the content introduction apparatus 3, and content data acquired in the content data distribution aspect at a download request, is provided in the hard disc device 203.

Controller 230

The controller 230, being configured, as heretofore described, of the CPU 202 and main memory 205, centrally controls a whole of the terminal apparatus 2 by the CPU 202 retrieving and executing the various kinds of program 214 to 220, stored in the main memory 205, as well as functioning as a participation process module, a message destination determination module, a message forwarding module, a stream reception process module, a stream relay module, a connection process module, a connection destination candidate selection module, a connection destination candidate transmission process module, a connection information notification module, a content holding terminal apparatus registration message generation module, a content holding terminal apparatus registration message transmission process module, a distribution source information determination module, an EPG acquisition module, a distribution source information message transmission process module, a catalog list acquisition module, a download process module, an upload process module, a display control module, a decoding module, a stream reproduction module, a download operation detection module, a content holding terminal apparatus information selection module, a content holding terminal apparatus information return module, a content reproduction module, and the like, to be described hereafter.

The controller 230 functions as the participation process module, the message destination determination module, and the message forwarding module by the CPU 202 executing the DHT process program 215, as the stream reception process module, the stream relay module and the like by the CPU 202 executing the stream control program 216, also, as the connection process module, the connection destination candidate selection module, the connection destination candidate transmission process module, the connection information notification module, the content holding terminal apparatus registration message generation module, the content holding terminal apparatus registration message transmission process module, the distribution source information determination module, and the EPG acquisition module by the CPU 202 executing the topology management program 217, also, as the distribution source information message transmission process module, the catalog list acquisition module, the download process module, the upload process module, the download operation detection module, the content holding terminal apparatus information selection module, the content holding terminal apparatus information return module, and the like, by the CPU 202 executing the content DL/UL program 218, also, as the display control module, and the like, by the CPU 202 executing the screen control program 219, and furthermore, as the decoding module, the stream reproduction module, the content reproduction module, and the like, by the CPU 202 executing the music decoder program 220.

Participation Process Module

The participation process module asks the contact destination introduction apparatus 4 for, and acquires, the location information of the contact destination terminal apparatus to which it should transmit a participation message. Then, the participation process module transmits a participation message to the contact destination terminal apparatus, and generates the routing table 223 based on the location information and identification information of other terminal apparatus transmitted from the contact destination terminal apparatus in response to the participation message (refer to FIG. 5).

Message Destination Determination Module

The message destination determination module, based on the destination identification information of the message received via the network 6, and on the routing table, determines whether or not the received message is addressed to its own terminal apparatus 2. The messages subject to determination by the message destination determination module are the heretofore described connection condition information message, connection destination introduction request message, channel registration message, connection request message, content holding terminal apparatus registration message, content holding terminal apparatus search message, content data request message, and the like.

The determination of whether or not the received message is addressed to its own terminal apparatus 2 is carried out by retrieving the destination terminal ID (destination identification information) included in the message, and is determined based on the routing table stored in the main memory 205. That is, when receiving the various kinds of message via the network interface 204, the message destination determination module compares the destination identification information included in the received message with the terminal ID stored in the routing table 223 and, in the event that it determines that the terminal ID in the routing table 223 which is nearest to the destination identification information included in the message is the terminal ID of its own terminal apparatus 2, determines that it is a message addressed to its own terminal apparatus 2.

Message Forwarding Module

In the event that it is determined, by the message destination determination module, that the message received via the network 6 is not addressed to its own terminal apparatus, the message forwarding module, based on the destination identification information of the received message, retrieves the location information of a forwarding destination terminal apparatus from the routing table 223, and forwards the received message to the forwarding destination terminal apparatus.

Stream Reception Process Module

The stream reception process module stream-receives, via the network interface 204, content data transmitted as a content packet, by means of the content data distribution aspect in the hierarchical structure, from the upstream apparatus, that is, the content distribution apparatus 1 logically connected upstream or the terminal apparatus 2 connected upstream, for each channel (a channel for viewing or listening, and a zapping countermeasure channel), and sequentially stores the content data stream-received in this way, for each channel, in the ring buffer area 221. A content data reception process module, and a content data relay module, to be described hereafter, as well as being able to use a heretofore known stream distribution protocol, can also use a unique dedicated protocol.

Stream Reproduction Module

The stream reproduction module has a function of sequentially reproducing the content data stream-received, via the network interface 204, from the upstream connection destination apparatus in the hierarchical structure of the channel in which it is participating, and sequentially stored in the ring buffer area 221.

The stream reproduction module, realizing the function by sequentially retrieving the content data stored in the ring buffer area 221, and causing the sound source chip 211 or video chip 209 to operate, carries out a reproduction of the content data by converting them into a predetermined content data format (for example, a Wave format), and inputting them into the sound source chip 211 or video chip 209.

Also, the stream reproduction module, based on reproduction starting time information included in the content data stored in the ring buffer area 221, decides on a time at which to reproduce the content data. That is, the stream reproduction module is configured in such a way as to transmit the content data stored in the ring buffer area 221 to the built-in speaker 212 or built-in display 210 at the reproduction starting time.

Stream Relay Module

The stream relay module sequentially retrieves content data stream-received, via the network 6, from the upstream connection destination apparatus in the content data distribution aspect in the hierarchical structure, that is, the content distribution apparatus 1 or the terminal apparatus 2 connected upstream, and temporarily stored in the ring buffer area 221, and forwards them, via the network 6, to another terminal apparatus 2 connected downstream.

Connection Process Module

The connection process module, in order to allow the terminal apparatus 2 to participate in the hierarchical structure of a desired channel in the content distribution system S, transmits a connection destination introduction request relating to a channel selected by an operation by the user of a channel selection button of the remote control 208, which is a channel selection module, to the connection management terminal apparatus, using the DHT routing, and subsequently, connects to a connection destination candidate notified of by the connection management terminal apparatus. More specifically, the connection process module acquires the channel ID of the channel in which it is to participate from the EPG (electronic program guide) and, with the channel ID as the destination identification information, transmits a connection destination introduction request message for connecting to the connection destination candidate for the hierarchical structure of the channel in which it is to participate, based on the information stored in the routing table 223. The channel ID of the channel selected by the user of the terminal apparatus 2 operating the channel selection button, or the like, of the remote control 208, and the location information, and the like, of its own terminal apparatus 2, are included in the connection destination introduction request message.

Also, the connection process module has a function as a connection destination candidate acquisition module which acquires a connection destination candidate, receiving information on a channel connection destination candidate, that is, information on the IP address, or the like, which is the location information of the connection destination candidate terminal apparatus, notified of, via the network 6, by the connection management terminal apparatus in response to the transmitted connection destination introduction request message.

Furthermore, the connection process module has a connection process function which, based on the received connection destination candidate information, transmits a connection request message to the connection destination candidate, and makes a logical connection to the connection destination candidate apparatus. That is, the connection process module, based on the connection destination candidate information, issues a connection request with the connection destination candidate IP address as the address, and makes a logical connection to the connection destination candidate. By connecting to the connection destination candidate in this way, its own terminal apparatus 2 participates in the desired channel hierarchical structure. The connection destination candidate connected to in this way is called the connection destination apparatus, as heretofore described.

Connection Destination Candidate Selection Module

The connection destination candidate selection module, when the message received by the message destination determination module is addressed to its own terminal apparatus 2, and when the received message is a connection destination introduction request message, selects one or more connection destination candidates from the connection condition information in the connection condition information table stored in the connection condition information storage area of the main memory 205.

Connection Destination Candidate Transmission Process Module

The connection destination candidate transmission process module transmits the one or more connection destination candidates selected by the connection destination candidate selection module, via the network 6, to the terminal apparatus 2 which has transmitted the connection destination introduction request message.

Connection Information Notification Module

The connection information notification module, when connecting to the connection destination candidate, transmits a connection condition information message, using the DHT routing, in order to notify the connection management terminal apparatus of the location information of its own terminal apparatus 2 and the connection destination candidate to which its own terminal apparatus 2 has connected, and of the allowable downstream quantity, which is the quantity of terminal apparatus 2 to which it is possible to connect downstream of its own terminal apparatus 2. As the connection condition information message is transmitted to the connection management terminal apparatus using the DHT routing, it is transmitted with the channel ID corresponding to the channel to whose hierarchical structure the connection has been made as the destination identification information, and based on the routing table 223.

Also, the connection information notification module, after connecting to the connection destination candidate, regularly transmits a connection condition information message, using the DHT routing, to the connection management terminal apparatus.

Content Holding Terminal Apparatus Registration Message Generation Module

The content holding terminal apparatus registration message generation module, when receiving content data from the content introduction apparatus 3, stores the received content data in the content data storage area of the hard disc device 203. Also, the content holding terminal apparatus registration message generation module generates a content holding terminal apparatus registration message including the terminal ID and IP address of its own terminal apparatus, with a content ID, calculated by hashing the content name of the content data with the predetermined hash function, as the destination identification information.

Content Holding Terminal Apparatus Registration Message Transmission Process Module The content holding terminal apparatus registration message transmission process module, using the DHT routing, transmits a content holding terminal apparatus registration message in order to inform the terminal apparatus which is the root terminal apparatus of the relevant content data of the fact that its own terminal apparatus 2 is holding the content data, and has become the content holding terminal apparatus. The content holding terminal apparatus registration message is a message including the content ID corresponding to the content data, introduced by the content introduction apparatus 3 and being held, and furthermore, the location information of its own terminal apparatus 2. As the content holding terminal apparatus registration message transmission process module transmits the message to the root terminal apparatus using the DHT routing, it transmits the message with the content ID corresponding to the content data being held as the destination identification information, and based on the routing table 223.

Distribution Source Information Determination Module

The distribution source information determination module, when the received message is a content holding terminal apparatus search message searching for the location information of the content holding terminal apparatus, determines whether or not there is a content ID in the index table 222 stored in the main memory 205 which matches the content ID included in the content holding terminal apparatus search message. That is, the distribution source information determination module determines whether or not there is, in the index table 222, the location information of the content holding terminal apparatus which is the search subject of the content holding terminal apparatus search message.

Distribution Source Information Message Transmission Process Module

The distribution source information message transmission process module, in the event that it is determined, by the distribution source information determination module, that there is, in the index table 222, the location information of the content holding terminal apparatus which is the search subject of the content holding terminal apparatus search message, retrieves the location information of the search subject content holding terminal apparatus from the index table 222, generates a distribution source information message, and transmits the distribution source information message to the terminal apparatus which has transmitted the content holding terminal apparatus search message. The location information of one or more content holding terminal apparatus being included in the distribution source information message, the terminal apparatus which has transmitted the content holding terminal apparatus search message can thereby acquire desired content data from the content holding terminal apparatus.

Content Data Request Message Transmission Process Module

The content data request message transmission process module, after receiving the distribution source information message, transmits a content data request message, asking for content data, to the content holding terminal apparatus described (included) in the distribution source information message.

EPG Acquisition Module

The EPG acquisition module has a function of receiving an electronic program guide (EPG) transmitted from the contact destination introduction apparatus 4. The electronic program guide transmitted from the contact destination introduction apparatus 4, being information in which are correlated program details and the channel ID of a channel of which a stream distribution can be requested, is transmitted from the contact destination introduction apparatus 4 by its own terminal apparatus 2 issuing an electronic program guide transmission request to the contact destination introduction apparatus 4.

Catalog List Acquisition Module

The catalog list acquisition module has a function of receiving a catalog list transmitted from the content introduction apparatus 3. The catalog list, which is an identification information list, transmitted from the content introduction apparatus 3, being information in which are correlated the names and content ID of content data of which a download can be requested, is transmitted from the content introduction apparatus 3 by its own terminal apparatus 2 issuing a catalog list transmission request to the content introduction apparatus 3.

Download Operation Detection Module

Figure 20:
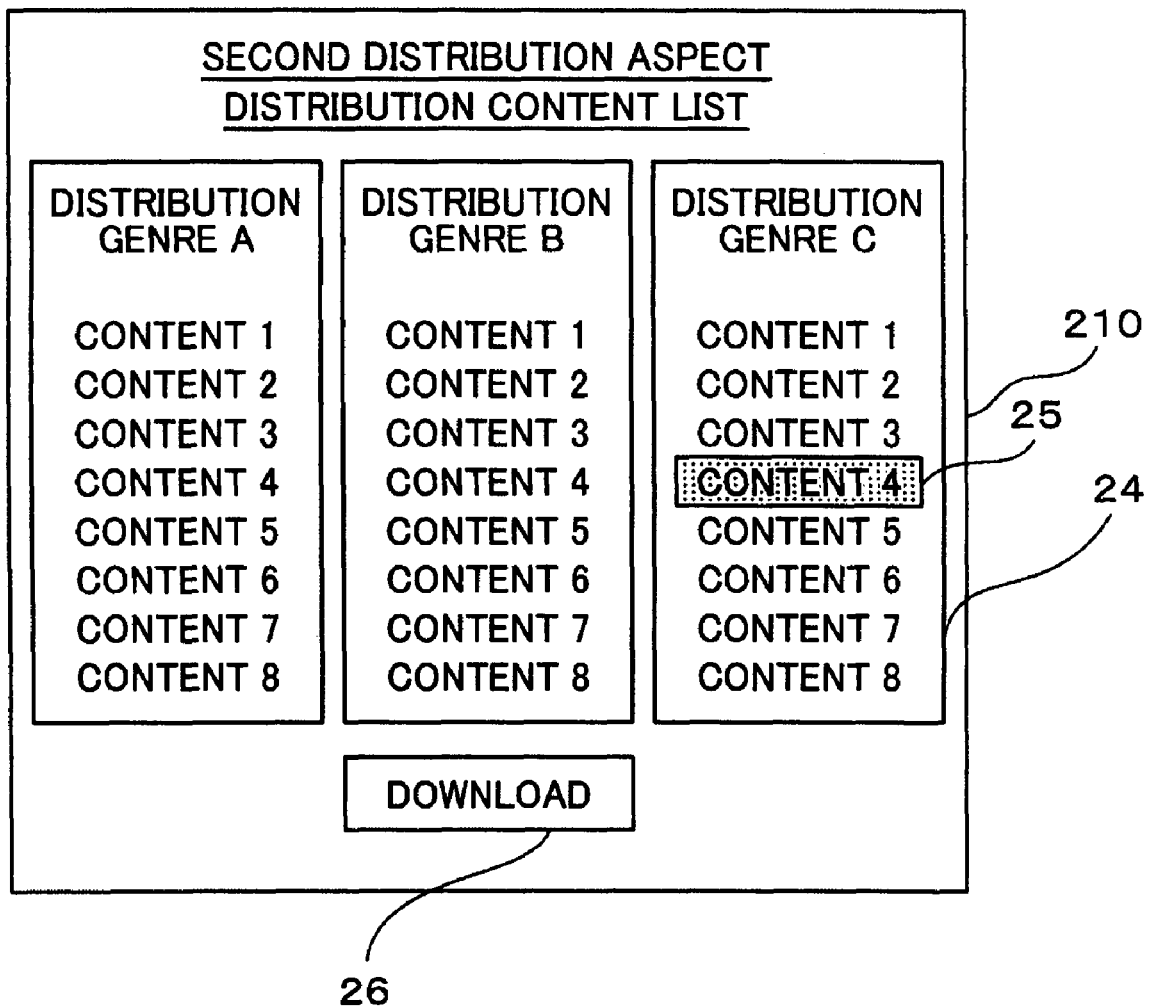
FIG. 20 is a diagram showing one example of a display screen in the terminal apparatus of FIG. 1.

The download operation detection module has a function of detecting an operation requesting a download of content data. For example, in a condition in which content data, downloadable in the content data distribution aspect at a download request, are displayed in a list in a predetermined area 24 of the built-in display 210, as shown in FIG. 20, the download operation detection module detects the operation requesting a download of content data by detecting that the user, operating the remote control 208, has designated content data to be downloaded by means of a designating frame 25, and selected a download button 26. The information listed in the predetermined area 24 of the built-in display 210 is information acquired by the catalog list acquisition module.

Download Process Module

The download process module, having a function of downloading the content data of which a download has been requested from the terminal apparatus 2 configuring the content distribution system S, based on the content data identification information acquired by the catalog list acquisition module, is configured of a download destination search module, a download transmission request module, a download data reception process module, and the like.

The download destination search module, based on the content data content ID acquired by the catalog list acquisition module, searches for the content holding terminal apparatus which holds the content data of which a download has been requested. The search for the content holding terminal apparatus is carried out by generating a content holding terminal apparatus search message with, among the content ID included in the catalog list acquired by the catalog list acquisition module, the content ID corresponding to the download subject content data detected by the download operation detection module as the destination identification information, retrieving the location information of a terminal apparatus having a terminal ID in the same area as the content ID from the routing table 223, and transmitting the content holding terminal apparatus search message to the terminal apparatus. In response to the content holding terminal apparatus search message, the location information of the content holding terminal apparatus holding the content data with the content ID specified by the content holding terminal apparatus search message is transmitted from the root terminal apparatus. In this way, the download destination search module searches for the content holding terminal apparatus which holds the content data of which a download has been requested.

Also, the download transmission request module asks the content holding terminal apparatus found by the download destination search module for a transmission, via the network 6, of the content data of which a download has been requested (hereafter called a "download transmission request"). The download transmission request, with the location information of the content holding terminal apparatus as the address, sets the content ID of the content data corresponding to the download request. In the event that there is a plurality of content holding terminal apparatus found by the download destination search module, the download transmission request is issued to one of the content holding terminal apparatus.

Also, the download data reception process module receives, via the network 6, the content data of which a download has been requested from the content holding terminal apparatus which holds the content data of which a download has been requested. Although the content data transmitted from the content holding terminal apparatus is data in a download format, rather than in a stream format like the content data distribution aspect in the hierarchical structure, it is also possible to make it a stream format.

The content data received by the download data reception process module are stored in the content data storage area of the hard disc device 203 by the controller 230.

Upload Process Module

The upload process module, in the event that there is a download request from another terminal apparatus 2 participating in the content distribution system S, has a function of retrieving the content data corresponding to the download request from the content data storage module, and transmitting them to the another terminal apparatus 2 which has issued the download request.

Display Control Module

The display control module, controlling the video chip 209 and built-in display 210, has a function of displaying content data and various kinds of information. That is, the display control module controls in what way a content image and the various kinds of information are displayed on the built-in display 210.

Decoding Module

The decoding module decodes content data, and the like, transmitted from another terminal apparatus 2, in order to display them on the built-in display 210, or output them from the built-in speaker 212. That is, the content data transmitted from another terminal apparatus 2 being encoded by a stream distribution data format, for example, a data format such as ASF, WMA or WMV, the content data encoded in this way are decoded in order that they can be displayed on the built-in display 210, or output from the built-in speaker 212.

Content Holding Terminal Apparatus Information Selection Module

The content holding terminal apparatus information selection module, in the event that it is determined, by the message destination determination module, that the message received via the network 6 is addressed to its own terminal apparatus 2, and that it is a content holding terminal apparatus search message, selects from the index table 222 the location information of the content holding terminal apparatus holding the content data with the content ID which is the subject of the content holding terminal apparatus search message. In the event that there is a plurality of items of content holding terminal apparatus location information in the index table 222, the content holding terminal apparatus information selection module selects all or some of them.

Content Holding Terminal Apparatus Information Return Module

The content holding terminal apparatus information return module returns the content holding terminal apparatus location information selected by the content holding terminal apparatus information selection module, via the network 6, to the request terminal apparatus.

Content Reproduction Module

The content reproduction module being a module which retrieves and reproduces the content data stored in the hard disc device 203, the content data are reproduced by the controller 230, at this time, causing the video chip 209 and sound source chip 211 to operate, based on the stream control program 216.

4. Operations of Content Distribution System S

Hereafter, a more specific description will be given, using flowcharts, of detailed operations of the content distribution apparatus 1 and terminal apparatus 2.

Description of Content Distribution Apparatus 1 Process Flow

Figure 14A:
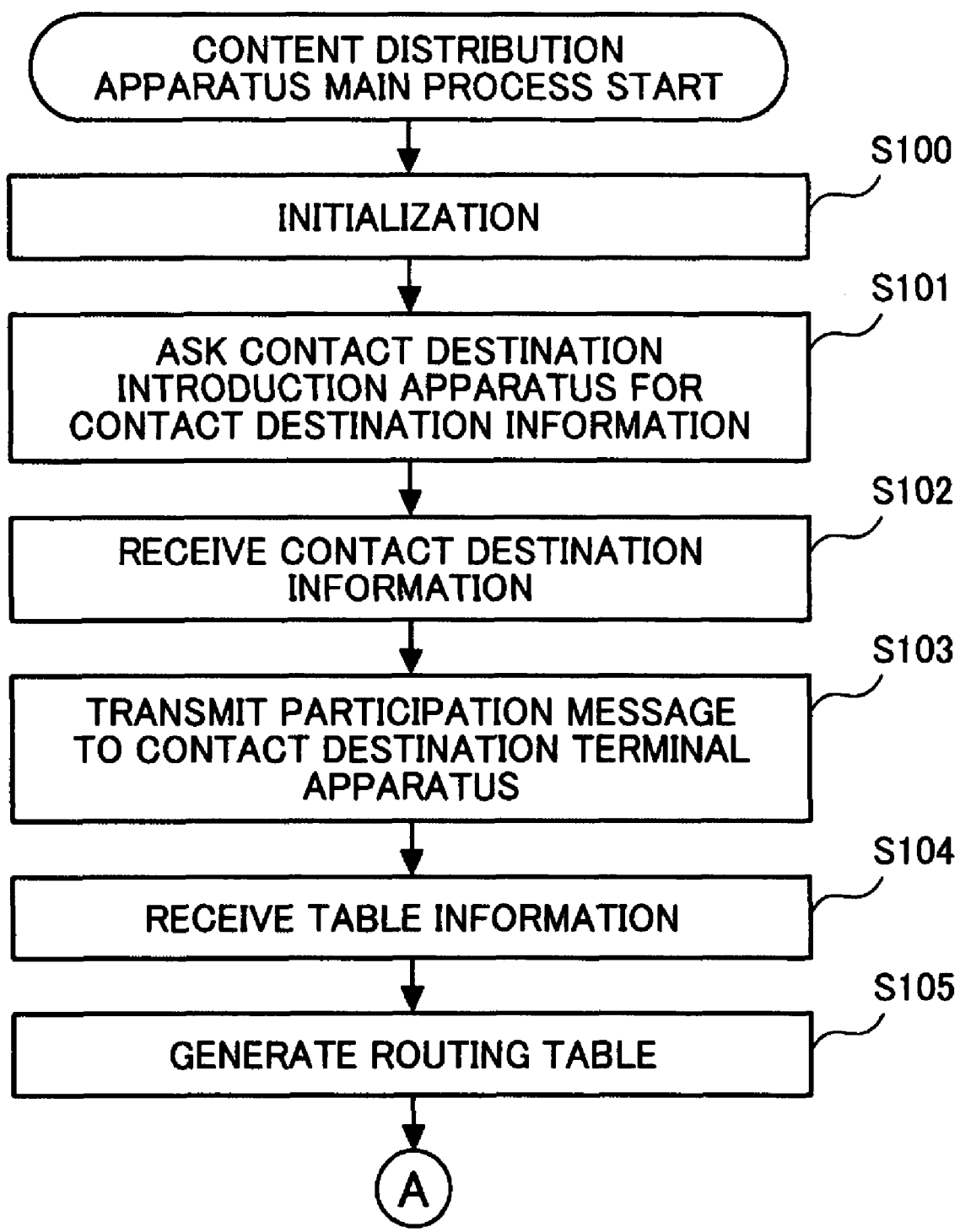
FIGS. 14A and 14B are flowcharts showing a main process in the content distribution apparatus of FIG. 1.
Figure 14B:
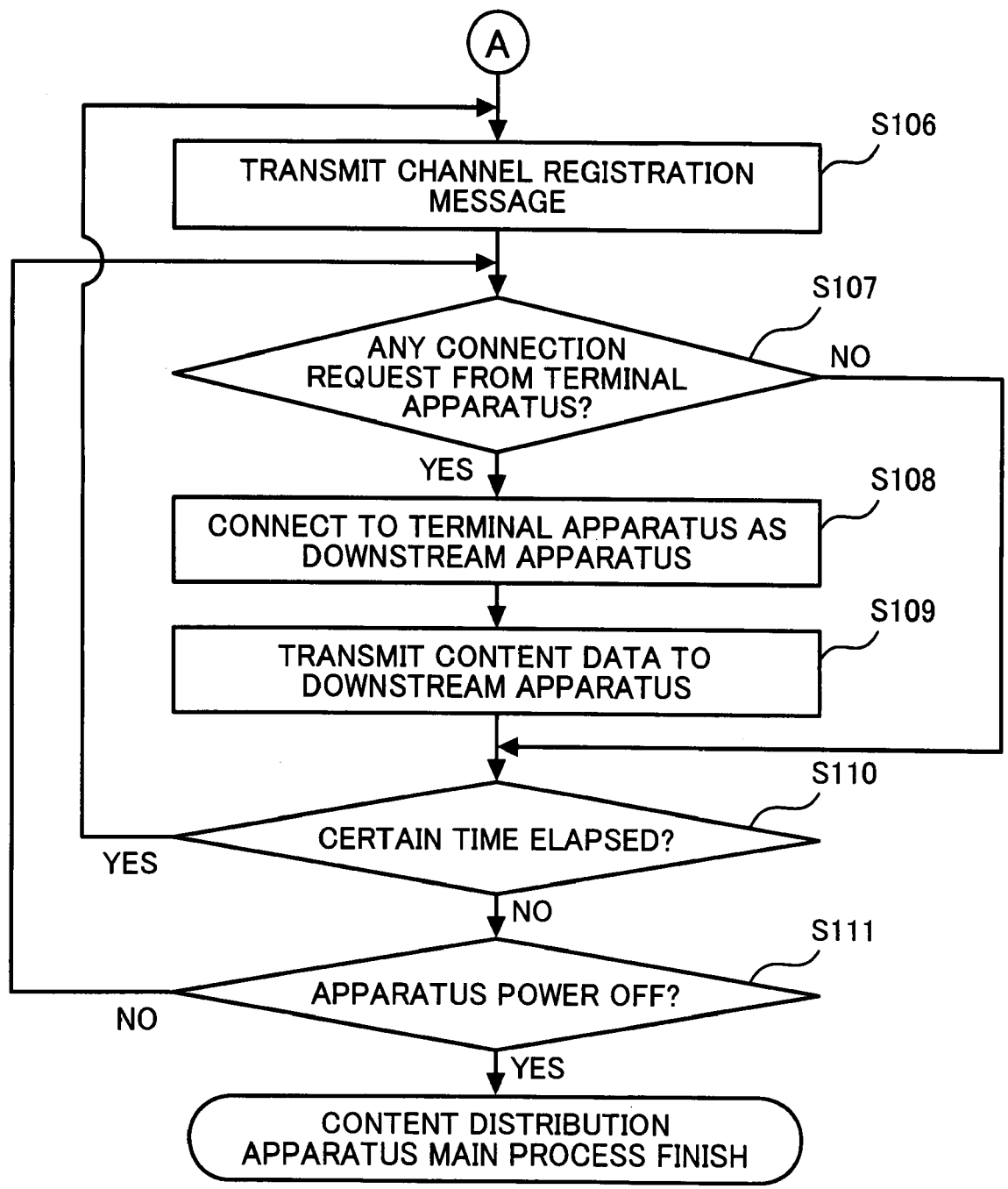
Figure 15A:
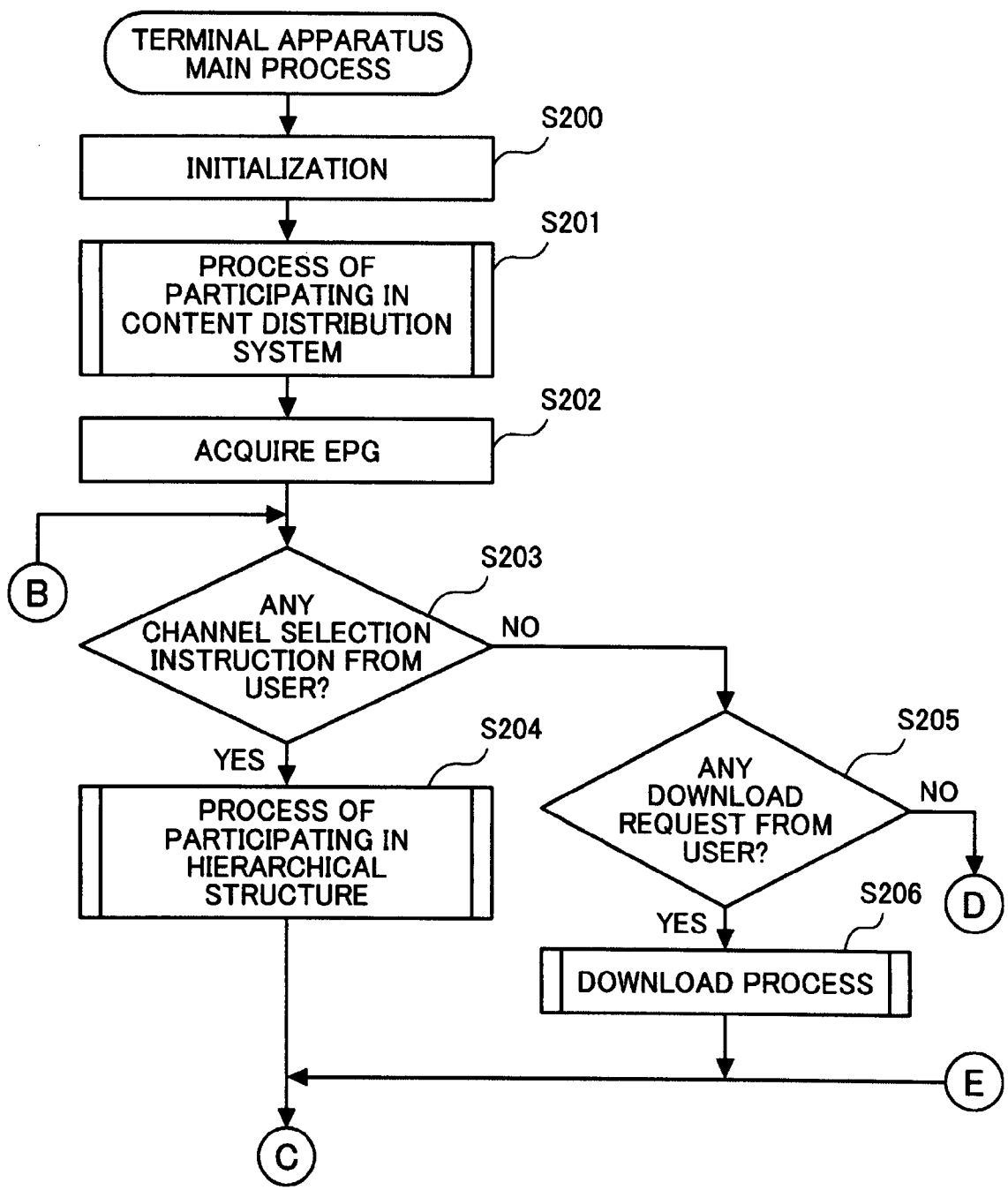
FIGS. 15A, 15B, 15C and 15D are flowcharts showing a main process in the terminal apparatus of FIG. 1.
Figure 15B:
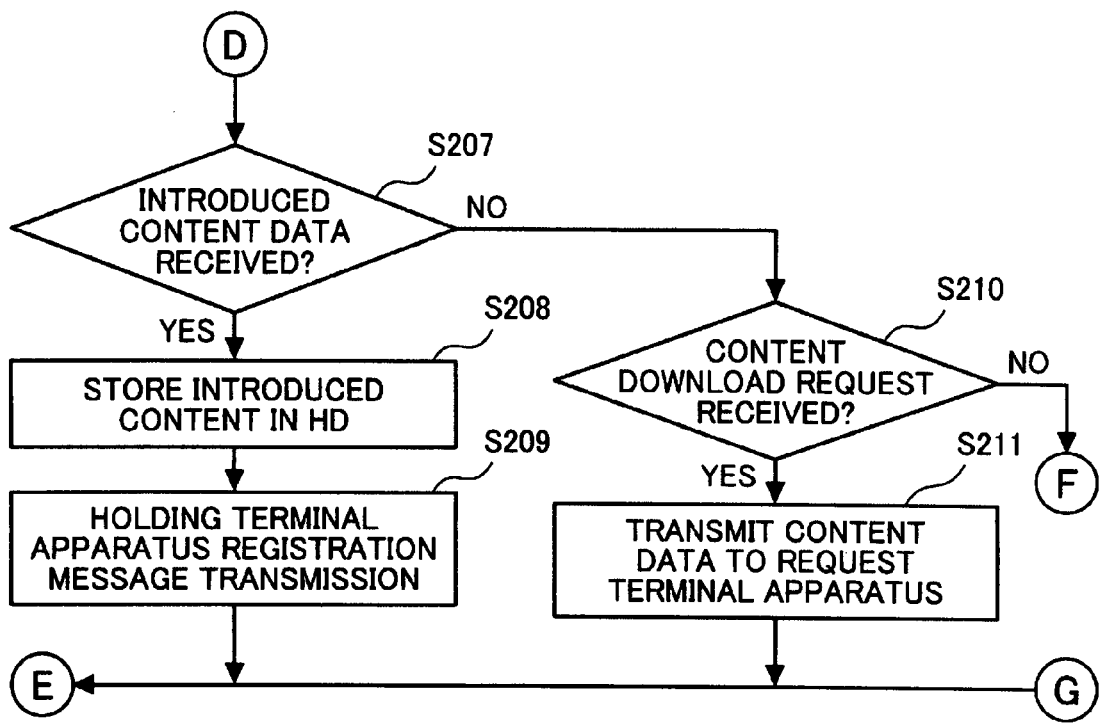
Figure 15C:
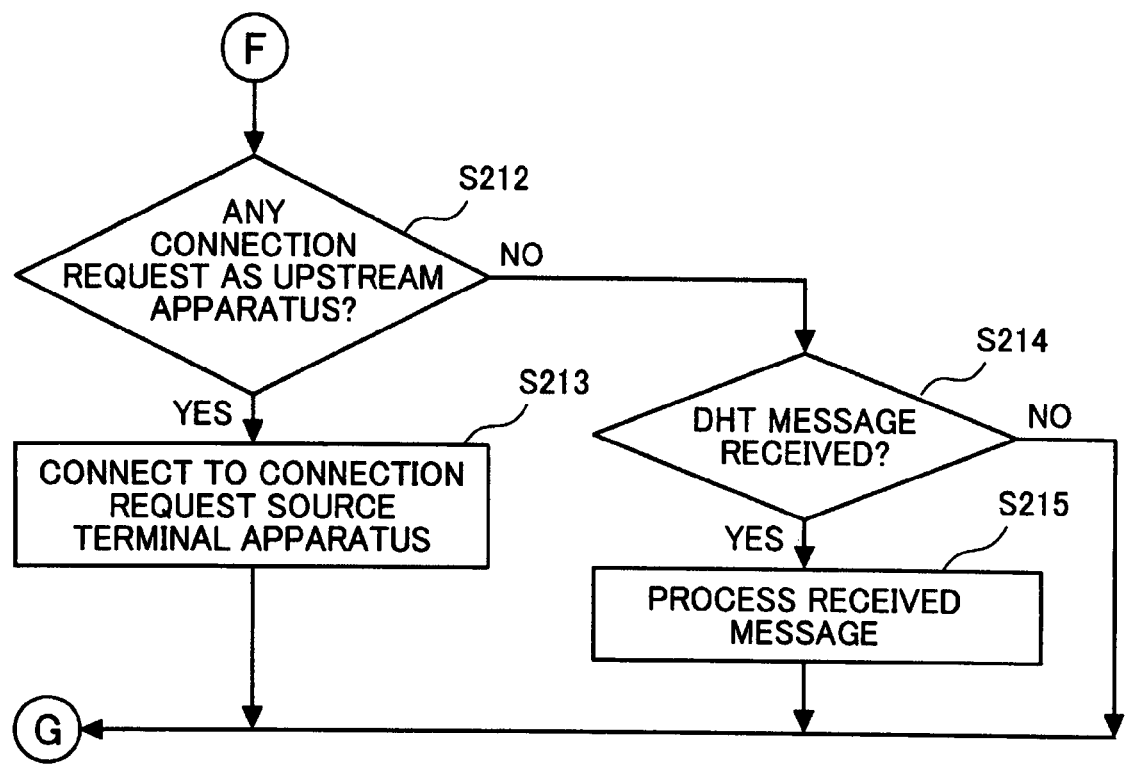
Figure 15D:
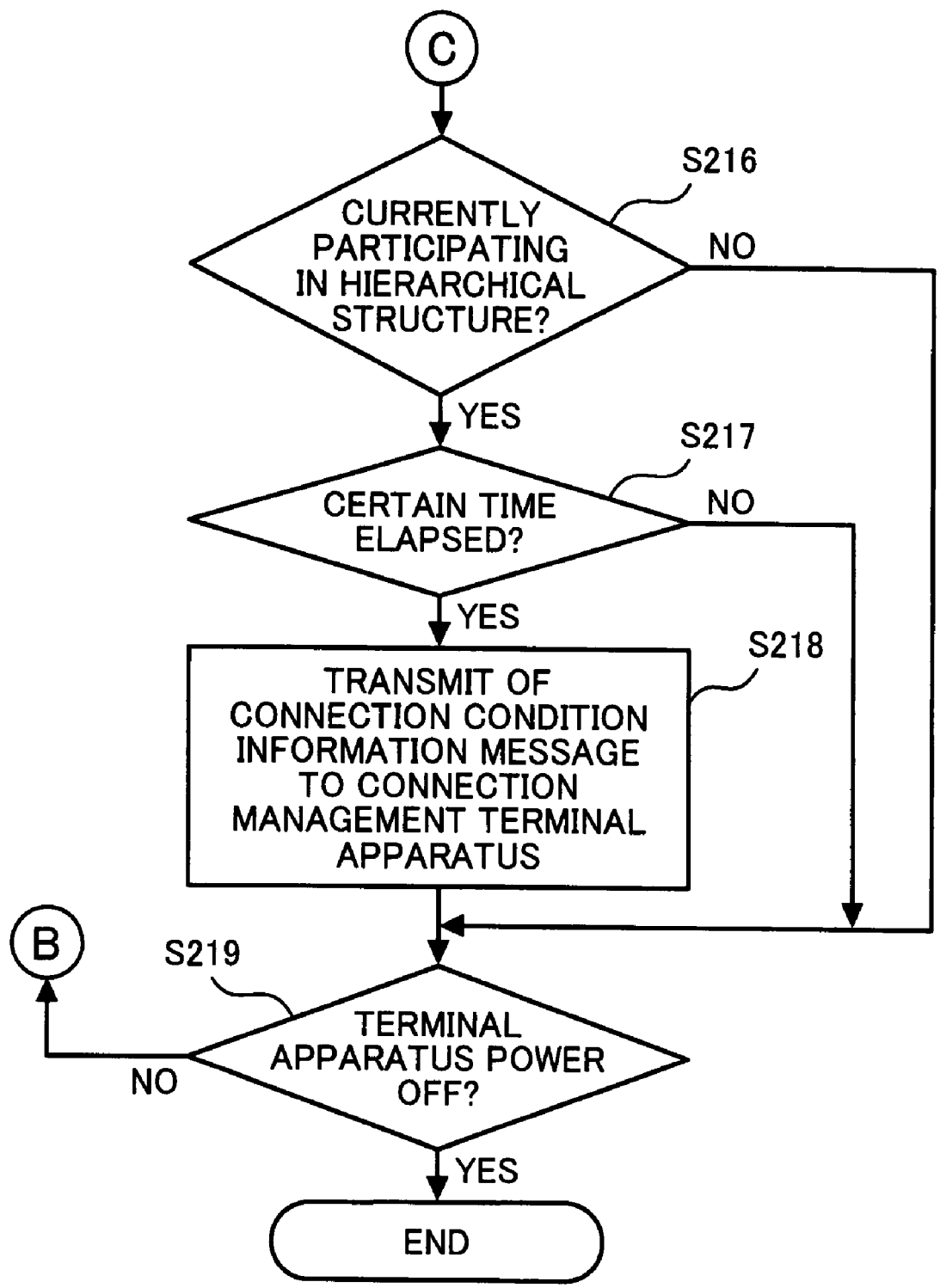

Firstly, a description will be given, referring to FIG. 14, of a more specific operation of the content distribution apparatus 1. FIG. 14 is a flowchart showing a whole of a process in the content distribution apparatus 1. Each of the following processes is executed by the controller 130 of the content distribution apparatus 1 functioning as the heretofore described modules. Also, although the content distribution apparatus 1 can also carry out the same kinds of operational processes as the operational processes in the terminal apparatus 2, to be described hereafter, as those operations are the same as the operations of the terminal apparatus 2, which will be described in detail hereafter, portions which are the same as the terminal apparatus 2 will be omitted in order to avoid a duplicated description.

Firstly, as shown in FIG. 14, on power of the content distribution apparatus 1 being turned on, in the content distribution apparatus 1, the CPU 102 executes initial setting processes, such as permitting an access to the main memory 105 and hard disc device 103, and initializing a working area (step S100), puts each program 115 to 119, and 121, into a condition in which it is executed by the CPU 102 and, after starting up a function as the controller 130, shifts the process to step S101.

In step S101, the controller 130 of the content distribution apparatus 1 asks the contact destination introduction apparatus 4 for contact destination information, via the network 6. The controller 130 receives the contact destination information transmitted, via the network 6, from the contact destination introduction apparatus 4 in response to the contact destination information request, via the network interface 104 (step S102).

The location information of the contact destination terminal apparatus being included in the received contact destination information, the controller 130 transmits a participation message, via the network 6, to the contact destination terminal apparatus included in the received contact destination information (step S103). The participation message has the identification information of its own terminal apparatus as the destination identification information.

The participation message transmitted in this way is sequentially forwarded from the contact destination terminal apparatus 2, arriving at the terminal apparatus 2 in a position from which forwarding is not possible. Then, the controller 130 receives table information for each level from the plurality of terminal apparatus which have received the participation message (step S104). The controller 130, based on the plurality of items of table information received in this way, generates a routing table (step S105), and shifts the process to step S106.

In step S106, the controller 130, based on the routing table 122 stored in the routing table storage area, transmits a channel registration message including the location information of its own content distribution apparatus 1, with the channel ID indicating the channel in which its own content distribution apparatus 1 stream-distributes content data as the destination identification information, and shifts the process to step S107.

In step S107, the controller 130 determines whether or not it has received a connection request message from the terminal apparatus 2 requesting a connection to the hierarchical structure of the channel of its own content distribution apparatus 1. If it is determined, in this process, that a connection request message has been received (step S107: Yes), the controller 130, with the terminal apparatus 2 which has transmitted the connection destination introduction request message as the downstream apparatus, carries out a logical connection to the terminal apparatus 2 (step S108), from when on the controller 130 carries out a distribution of content data to the logically connected terminal apparatus (step S109), and shifts the process to step S110. Meanwhile, if it is determined that no connection request message has been received (step S107: No), the controller 130 shifts the process to step S110.

In the process of step S110, the controller 130 determines, by means of an unshown timer, whether or not a certain time has elapsed. If it is determined, in the process, that the certain time has elapsed (step S110: Yes), the controller 130 resets the heretofore mentioned timer, restarts the timing, and shifts the process to step S106, while if it is determined that the certain time has not elapsed (step S110: No), the controller 130 shifts the process to step S111.

In step S111, the controller 130 determines whether or not the power is off and, if it is determined that the power is off (step S111: Yes), finishes the process, while if it is determined that the power is not off (step S111: No), the controller 130 once more executes the process from step S107.

As heretofore described, in the content distribution apparatus 1 in the embodiment, the channel ID of the channel in which the content distribution apparatus 1 distributes, the location information of the content distribution apparatus 1, and the like, are registered in, among the terminal apparatus 2 participating in the content distribution system S, the terminal apparatus 2 which is the management terminal apparatus managing the hierarchical structure of the channel in which the content distribution apparatus 1 distributes, after which, in the event that there is a connection request from a terminal apparatus which has been notified by the management terminal apparatus that the content distribution apparatus 1 is a connection destination candidate, connecting it as a downstream apparatus, it is possible to cause the terminal apparatus of the content distribution system S to manage the hierarchical structure of the channel in which the content distribution apparatus 1 distributes, meaning that there is no need to provide a separate connection destination management server, which has heretofore been necessary.

Description of Terminal Apparatus 2 Process Flow

Next, a description will be given, referring to FIGS. 15 to 19, of a more specific operation of the terminal apparatus 2. FIGS. 15 to 19 are flowcharts showing a whole process in the terminal apparatus 2. Each of the following processes is executed by the controller 230 of the terminal apparatus 2 functioning as the heretofore described modules.

As shown in FIG. 15, on power of the terminal apparatus 2 being turned on, the CPU 202 of the terminal apparatus 2 executes initial setting operations, such as permitting an access to the main memory 205 and hard disc device 203, and initializing a securing of a working area, puts each program 214 to 220 into a condition in which it is executed by the CPU 202 and, after starting up a function as the controller 230 (step S200), shifts the process to step S201.

In step S201, the controller 230, after carrying out a process of participating in the content distribution system S, shifts the process to step S202. The process of step S201, being the process of steps S220 to S224 in FIG. 16, will be described in detail hereafter.

In step S202, the controller 230 asks the contact destination introduction apparatus 4, via the network 6, for the electronic program guide, in order to select the channel in which the content distribution apparatus 1 distributes. Subsequently, the controller 230 displays the electronic program guide which the content introduction apparatus 3 transmits, in response to the request, on the built-in display 210 (for example, refer to FIG. 20).

After displaying the electronic program guide on the built-in display 210, the controller 230 determines whether or not there has been a channel selection instruction from the user (step S203). In the process, that there has been a channel selection instruction from the user means that, for example, a channel of which a viewing or listening to is requested has been selected by the user of the terminal apparatus 2 operating the channel selection button, or the like, of the remote control 208.

If it is determined, in the process, that there has been a channel selection instruction from the user (step S203: Yes), the controller 230 carries out a process of participating in the hierarchical structure of the channel selected by the user (step S204). The process of step S204, being the process of steps S230 to S236 in FIG. 17, will be described in detail hereafter.

Meanwhile, if it is determined that there has been no channel selection instruction from the user (step S203: No), the controller 230 determines whether or not there is a download request from the user (step S205). In the process, a download request from the user means that, for example, in a listed condition as shown in FIG. 20, the user designates specific content data from the list by operating the remote control 208.

If it is determined, in the process, that there is a download request from the user (step S205: Yes), the controller 230 carries out a process of downloading the content data for which there has been a download request from the user from another terminal apparatus 2 (step S206). The process of step S205, being the process of steps S240 to S243 in FIG. 18, will be described in detail hereafter.

Meanwhile, if it is determined that there is no download request from the user (step S205: No), the controller 230 determines whether or not it has received introduced content data (step S207). Herein, introduced content data are content data introduced by the content introduction apparatus 3.

If it is determined, in the process, that introduced content data have been received (step S207: Yes), the controller 230 stores the introduced content data in the content data storage area of the hard disc device 203 (step S208). Subsequently, the controller 230 transmits a content holding terminal apparatus registration message, so that it is possible to download the content data stored in the hard disc device 203 from the terminal apparatus 2 participating in the content distribution system S (step S209).

If it is determined, in step S207, that no introduced content data have been received (step S207: No), the controller 230 determines whether or not it has received a download request, from another terminal apparatus 2, for the content data which its own terminal apparatus 2 is holding as the content holding terminal apparatus (step S210).

If it is determined, in the process, that a download request has been received from another terminal apparatus 2 (step S210: Yes), the controller 230 retrieves content data corresponding to the download request from the hard disc device 203, and transmits them to the another terminal apparatus 2 which has issued the download request (step S211). Meanwhile, if it is determined that no download request has been received from another terminal apparatus 2 (step S210: No), the controller 230 determines whether or not it has received a connection request as an upstream apparatus (step S212). Herein, a connection request as an upstream apparatus means that its own terminal apparatus 2 has been chosen as a connection destination candidate, and that another terminal apparatus 2 wishes to connect downstream of its own terminal apparatus 2.

If it is determined, in the process, that it has received a connection request as an upstream apparatus (step S212: Yes), the controller 230 connects the terminal apparatus which has requested the connection as a downstream apparatus of its own terminal apparatus 2 (step S213). Meanwhile, if it is determined that it has not received a connection request as an upstream apparatus (step S212: No), the controller 230 determines whether or not it has received a DHT message (step S214). Herein, a DHT message means a DHT routed message with content ID, channel ID, terminal ID, or the like, as the destination identification information.

If the controller 230 determines, in the process, that it has received a DHT message (step S214: Yes), the controller 230 carries out a processing of the received message (step S215). The process of step S215, being the process of steps S250 to S263 in FIG. 19, will be described in detail hereafter.

When it is determined, in step S214, that no DHT message has been received (step S214: No), or when the process of S204, S206, S209, S211, S213, or S215 is finished, the controller 230 determines whether or not it is currently participating in the hierarchical structure of the channel (step S216).

If it is determined, in the process, that the controller 230 is currently participating in the hierarchical structure of the channel (step S216: Yes), the controller 130 determines, by means of an unshown timer, whether or not a certain time has elapsed (step S217). If it is determined, in the process, that the certain time has elapsed (step S217: Yes), the controller 230 resets the heretofore mentioned timer, restarts the timing and, using the DHT routing, transmits a connection condition information message to the connection management terminal apparatus (step S218).

When it is determined, in step S216, that the controller 230 is not currently participating in the hierarchical structure of the channel (step S216: No), when it is determined, in S217, that the certain time has not elapsed (step S217: No), or when the process of step S218 is finished, the controller 230 determines whether or not the power is off (step S219). If it is determined that the power is off (step S219: Yes), the controller 230 finishes the process, while if it is determined that the power is not off (step S219: No), the controller 230 executes the process once more from step S203.

Figure 16:
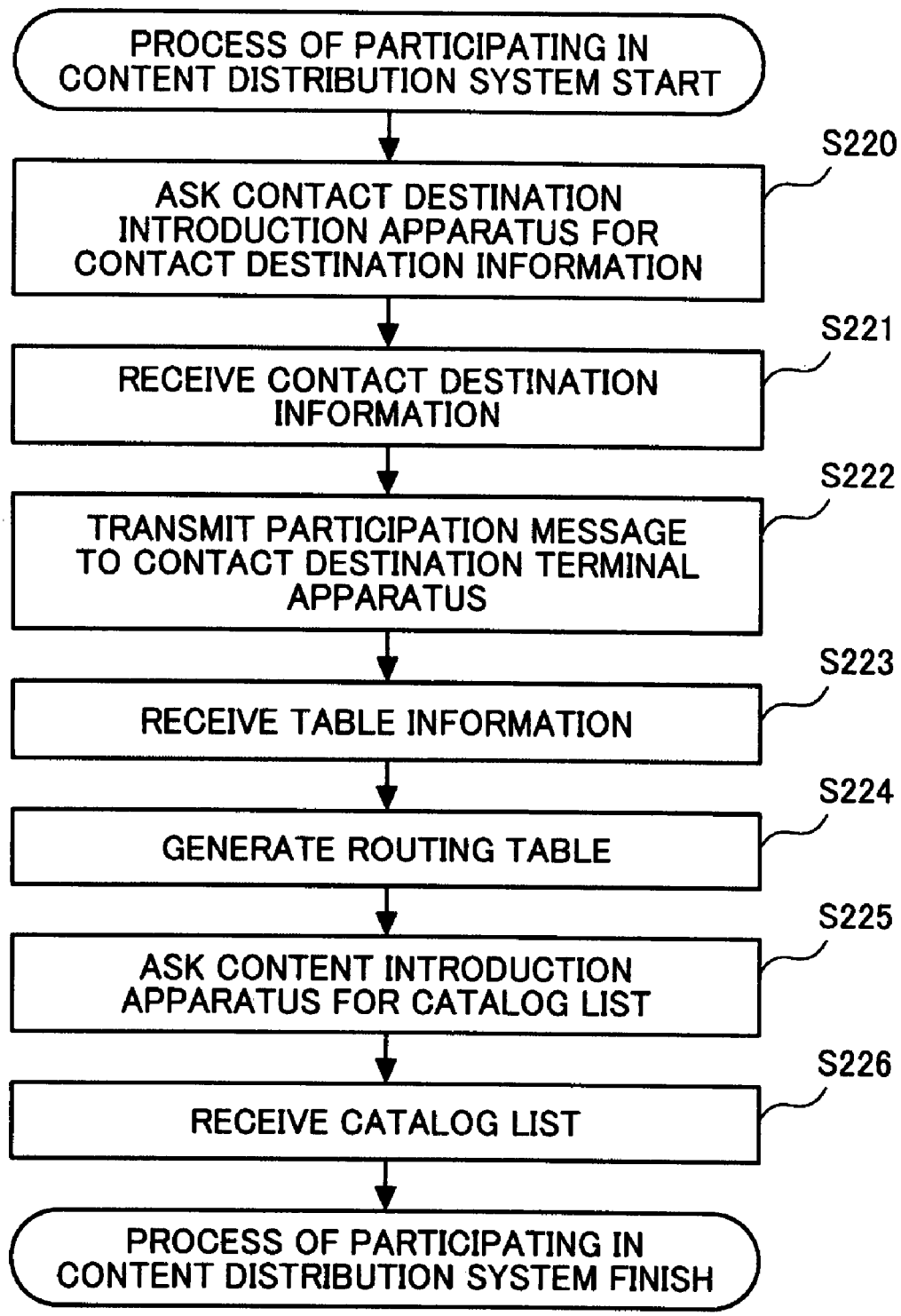
FIG. 16 is a flowchart showing a process in the terminal apparatus of participating in the content distribution system.

Next, a specific description will be given, referring to FIG. 16, of the process of participating in the content distribution system S in S204.

Firstly, the controller 230 of the terminal apparatus 2 asks the contact destination introduction apparatus 4, via the network 6, for contact destination information (step S220). The controller 230 receives, via the network interface 204, the contact destination information transmitted, via the network 6, from the contact destination introduction apparatus 4 in response to the request for contact destination information (step S221).

The location information of the contact destination terminal apparatus being included in the received contact destination information, the controller 230 transmits a participation message, via the network 6, to the contact destination terminal apparatus included in the received contact destination information (step S222). The participation message has the identification information of its own terminal apparatus as the destination identification information.

The participation message transmitted in this way is sequentially forwarded from the contact destination terminal apparatus 2, arriving at the terminal apparatus 2 in a position from which forwarding is not possible. The controller 230 receives table information for each level from the plurality of terminal apparatus which have received the participation message (step S223). The controller 230, based on the plurality of items of table information received in this way, generates the routing table 223 (step S224).

Subsequently, the controller 230 asks the content introduction apparatus 3, via the network 6, for the catalog list (step S225). On the catalog list being transmitted from the content introduction apparatus 3 in response to the request, the controller 230 receives it, stores it in the hard disc device 203 (step S226), and finishes the process of participating in the content distribution system S.

Figure 17:
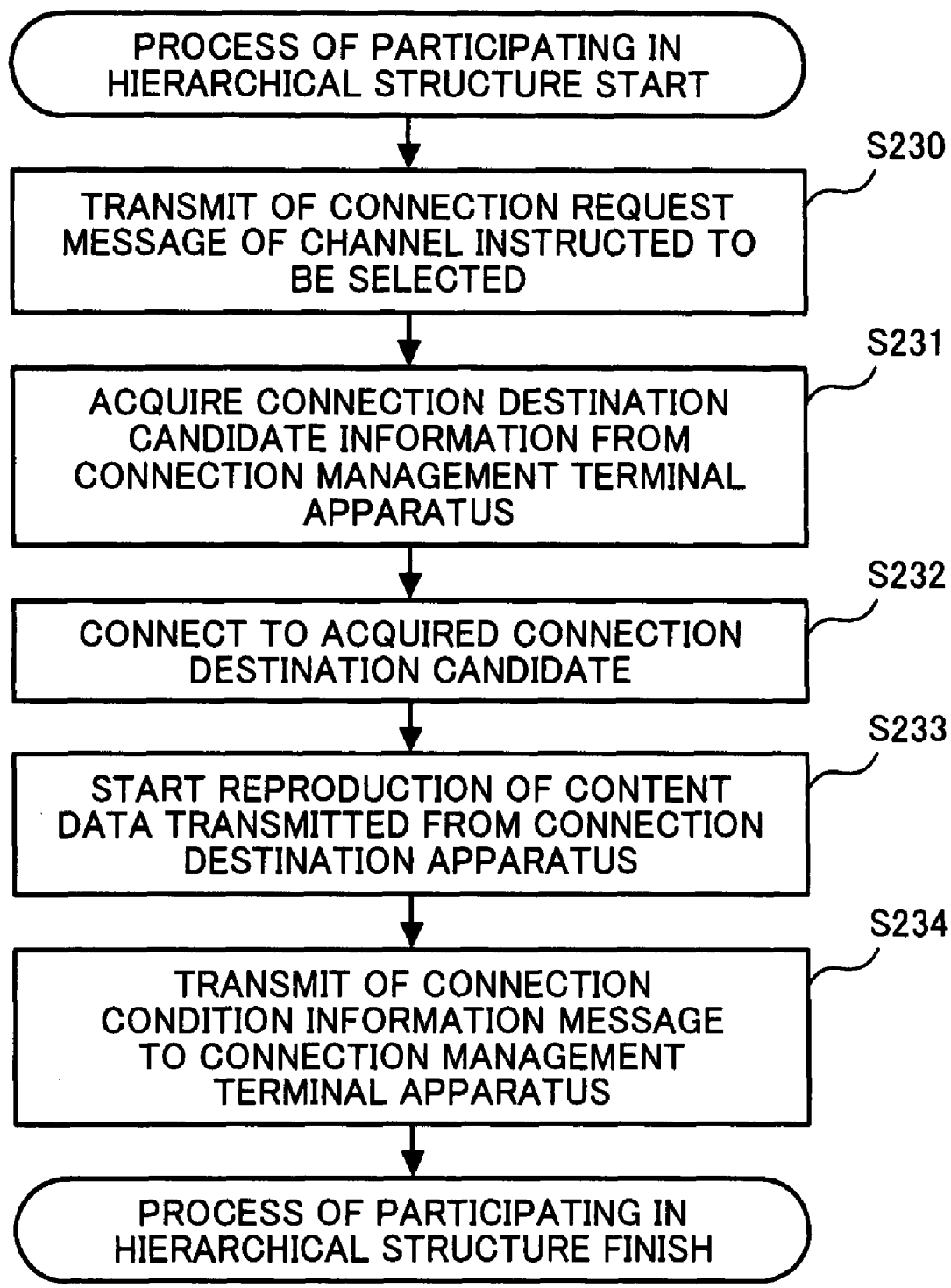
FIG. 17 is a flowchart showing a process in the terminal apparatus of connecting to the hierarchical structure of the channel.

Next, a specific description will be given, referring to FIG. 17, of the process of connecting to the hierarchical structure in S204.

Firstly, the controller 230 transmits a connection destination introduction request message for the channel indicated by the selection by the user instep S203 (step S230). The connection destination introduction request message, being a message in response to which the channel ID of the channel indicated by the selection by the user is set as the destination identification information, is transmitted, using the DHT routing table, to the connection management terminal apparatus of the channel which has the set channel ID. Then, in response to the connection destination introduction request message, the controller 230 receives information on a connection destination candidate from the connection management terminal apparatus of the selected channel (step S231). The channel ID, information thereon being included in the electronic program guide, is retrieved from the electronic program guide when indicated by the selection by the user.

Next, the controller 230, issuing a request for a connection to the connection destination candidate acquired from the connection management terminal apparatus, connects to the connection destination candidate (step S232). On connecting to the upstream apparatus in this way, as content data are stream-distributed from the upstream apparatus, the controller 230 carries out a stream reception and stream reproduction of the content data from the upstream apparatus (step S233). Also, when apparatus are connected downstream of its own terminal apparatus 2, the controller 230 stream-relays the stream-received content data to the downstream apparatus.

Furthermore, the controller 230, based on the routing table 223, transmits a connection condition information message, including the location information of the connected connection destination candidate, the location information of its own terminal apparatus, the channel ID of the hierarchical structure to which its own terminal apparatus is connected, and the like, to the connection management terminal apparatus (step S234), and finishes the process of participating in the hierarchical structure of the channel.

In this way, the controller 230, after connecting to the connection destination candidate for the desired channel, regularly transmits a connection condition information message, based on the routing table 223, with the channel ID as the destination identification information.

Figure 18:
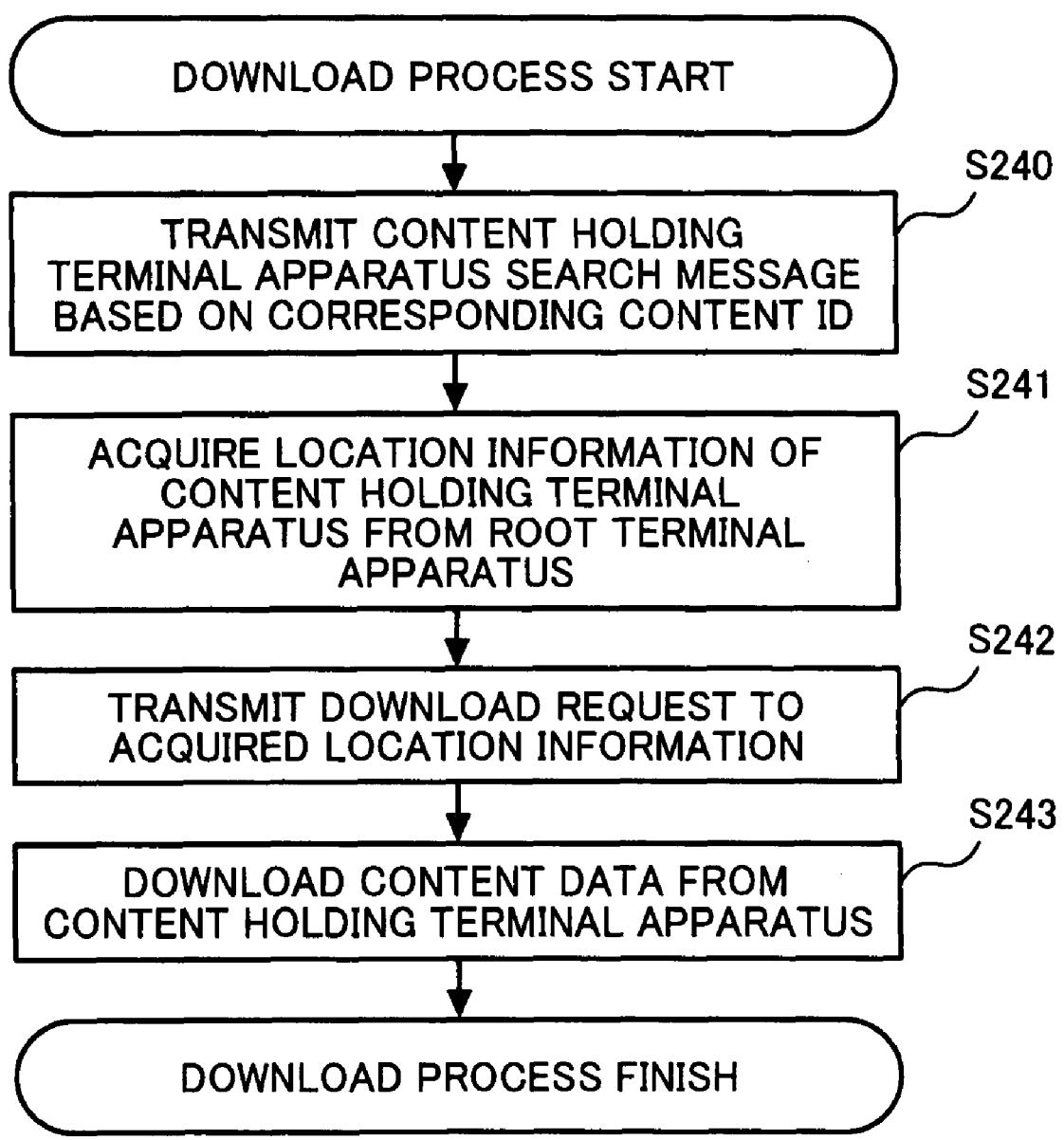
FIG. 18 is a flowchart showing a download process in the terminal apparatus.

Next, a specific description will be given, referring to FIG. 18, of the download process in S206.

Firstly, the controller 230 generates and transmits a content holding terminal apparatus search message, in order to search for the location information of the terminal apparatus 2 holding the content data for which there has been a download request from the user (step S240). The location information of its own terminal apparatus is included in the content holding terminal apparatus search message. Also, the controller 230 retrieves from the catalog list the content ID of the content data for which there has been a download request from the user and, with the content ID as the destination identification information of the content holding terminal apparatus search message, transmits the message, based on the routing table 223.

The content holding terminal apparatus search message transmitted in step S240, using the DHT routing, arrives at the root terminal apparatus of the content ID included in the message. The root terminal apparatus, on receiving the message, retrieves from the index table 222 the location information of the content holding terminal apparatus holding the content data corresponding to the content ID, and returns it to the terminal apparatus which has transmitted the content holding terminal apparatus search message. The controller 230 acquires the location information of the content holding terminal apparatus, via the network 6, from the root terminal apparatus (step S241).

Next, based on the acquired location information of the content holding terminal apparatus, the controller 230 asks the content holding terminal apparatus to transmit a direct download (step S242). The content holding terminal apparatus which receives the download request retrieves the corresponding content data from the content data storage area, and transmits them to the terminal apparatus which has issued the download request. The controller 230 downloads the content data transmitted from the content holding terminal apparatus, via the network interface 204 (step S243), and finishes the download process.

Figure 19A:
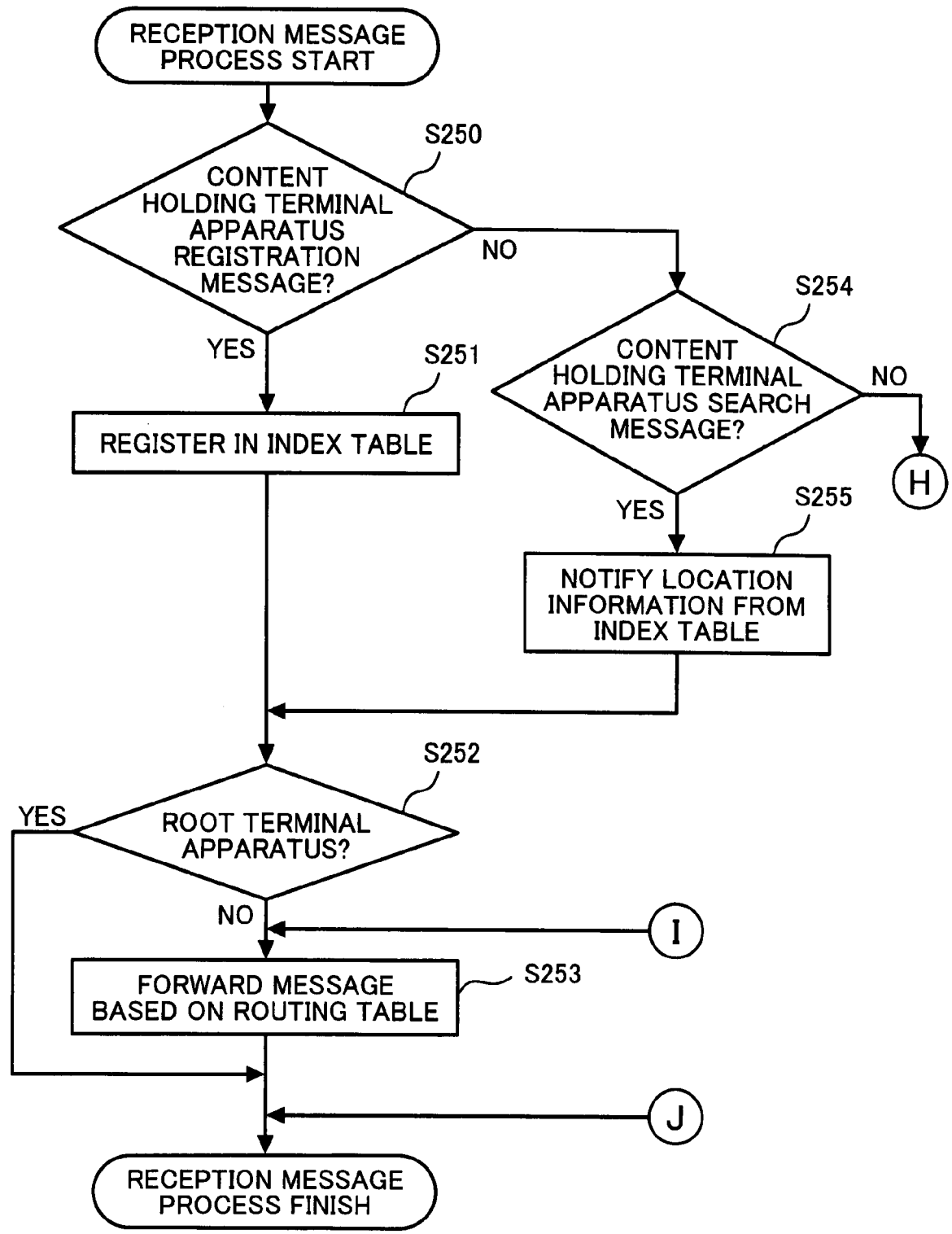
FIGS. 19A and 19B are flowcharts showing a processing of a received message in the terminal apparatus.
Figure 19B:
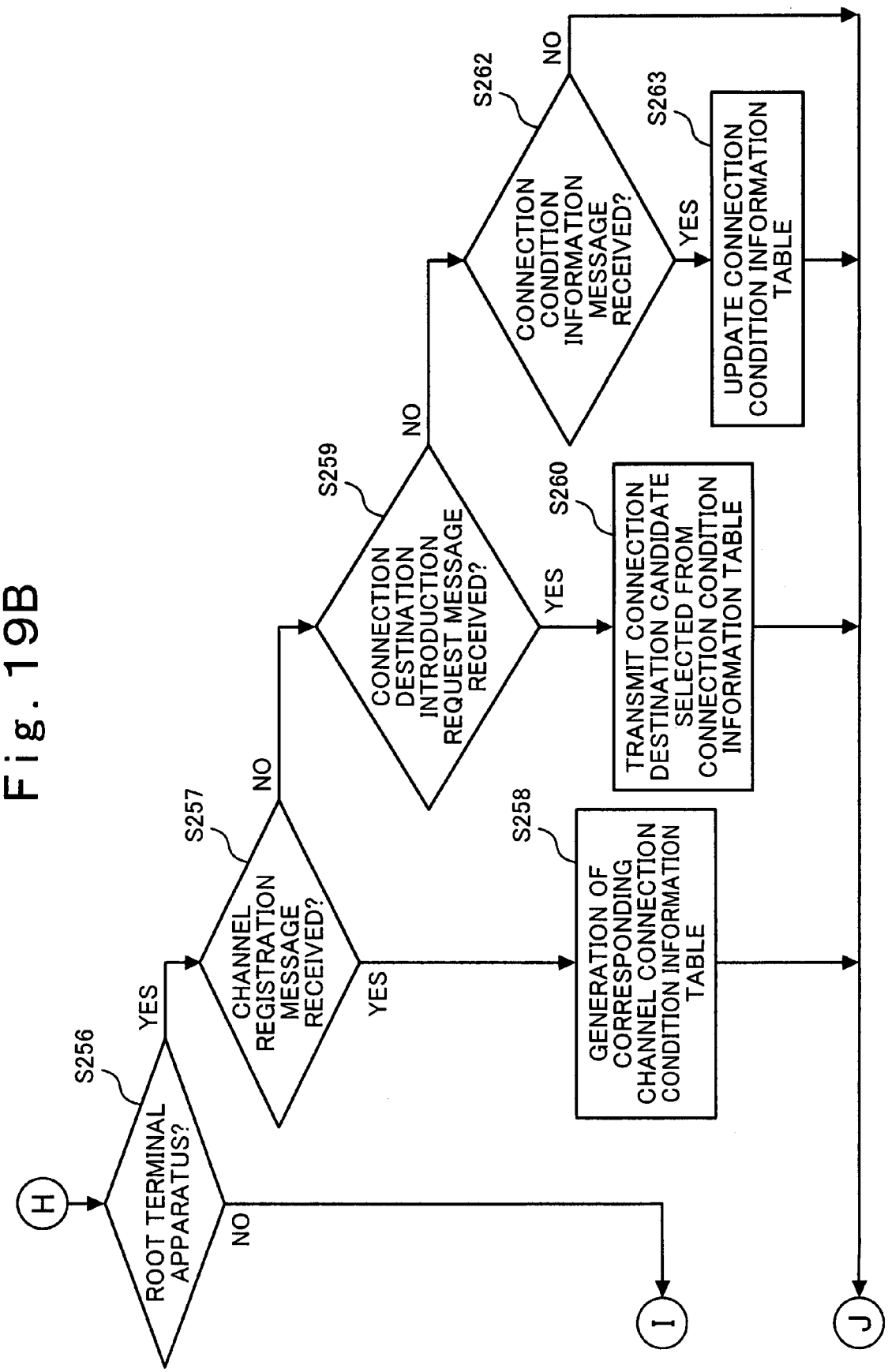

Next, a specific description will be given, referring to FIG. 19, of the processing of the received message in S215.

On the processing of the received message being started, the controller 230 determines whether or not the received message is a content holding terminal apparatus registration message (step S250). If it determines that it is a content holding terminal apparatus registration message (step S250: Yes), the controller 230 retrieves the content ID and content holding terminal apparatus location information included in the message, registers them in the index table 222 (step S251), and shifts the process to step S252.

In step S252, the controller 230 determines whether or not its own terminal apparatus 2 is the root terminal apparatus. The determination of whether or not the terminal apparatus 2 is the root terminal apparatus is made based on the destination identification information of the received message, and on the routing table 223.

If it is determined, in the process, that its own terminal apparatus 2 is not the root terminal apparatus (step S252: No), the controller 230, based on the routing table 223, forwards the content holding terminal apparatus registration message to another terminal apparatus 2 (step S253). Meanwhile, if it is determined that its own terminal apparatus 2 is the root terminal apparatus (step S252: Yes), the controller 230 does not carry out the process of step S253.

If it is determined, in step S250, that the received message is not a content holding terminal apparatus registration message (step S250: No), the controller 230 determines whether or not the received message is a content holding terminal apparatus search message (step S254).

If it is determined, in the process, that the received message is a content holding terminal apparatus search message (step S254: Yes), the controller 230 determines whether or not the location information of the content holding terminal apparatus holding the content data which are the search subject of the message is in the index table 222. When a result of the determination is that the location information of the content holding terminal apparatus is in the index table 222, the controller 230 retrieves the location information of the content holding terminal apparatus from the index table 222, notifies the message transmission source terminal apparatus 2 (step S255), and shifts the process to step S252. Meanwhile, when the location information of the content holding terminal apparatus is not in the index table 222, the controller 230 shifts the process to step S252, without notifying of the location information of the content holding terminal apparatus.

If it is determined, in step S254, that the received message is not a content holding terminal apparatus search message (step S254: No), the controller 230 determines, based on the destination identification information of the received message, whether or not its own terminal apparatus 2 is the root terminal apparatus (step S256). That is, being a determination of whether or not the terminal apparatus 2 which is the transmission objective of the received message is its own terminal apparatus 2, it is determined based on the destination identification information of the received message, and on the routing table 223. Specifically, when the terminal ID which has the smallest difference from the destination identification information of the message is allotted to its own terminal apparatus 2, the controller 230 determines that the terminal apparatus 2 which is the transmission objective of the received message is its own terminal apparatus 2.

If it is determined, in the process, that the destination identification information of the received message is not nearest to its own terminal apparatus (step S256: No), the controller 230 shifts the process to step S253. Meanwhile, if it is determined that the destination identification information of the received message is nearest to its own terminal apparatus (step S256: Yes), the controller 230 shifts the process to step S257.

In step S257, the controller 230 determines whether or not the received message is a channel registration message (step S257). If it is determined, in the process, that the received message is a channel registration message (step S257: Yes), the controller 230 newly generates a connection condition information table corresponding to the channel ID included in the channel registration message, and stores it in the connection condition information storage area of the main memory 205 (step S258). Meanwhile, if it is determined that the received message is not a channel registration message (step S257: No), the controller 230 determines whether or not the received message is a connection destination introduction request message (step S259).

If it is determined, in the process that the received message is a connection destination introduction request message (step S259: Yes), the controller 230 returns the connection destination candidate selected from the connection condition information table stored in the main memory 205 to the terminal apparatus 2 which has transmitted the message (step S260). Herein, as the connection condition information table from which the connection destination candidate is selected, the connection condition information table corresponding to the channel ID included in the connection destination introduction request message is selected. By so doing, when its own terminal apparatus 2 is the connection management terminal apparatus, based on the condition of the hierarchical structure of the management subject channel, the controller 230 can notify the terminal apparatus 2 attempting to participate in the channel hierarchical structure of a connection destination thereof.

Meanwhile, if it is determined that the received message is not a connection destination introduction request message (step S259: No), the controller 230 determines whether or not the received message is a connection condition information message (step S262). If it is determined, in the process, that the received message is a connection condition information message (step S262: Yes), the controller 230 retrieves the connection condition information table corresponding to the channel ID included in the connection condition information message, and adds to, or updates, the retrieved connection condition information table with the information included in the connection condition information message (step S263). By so doing, when its own terminal apparatus 2 is the connection management terminal apparatus, the controller 230 can manage the condition of the hierarchical structure of the management subject channel.

When its own terminal apparatus is the root terminal apparatus (step S252: Yes), when the process of step S253, S258, S260, or S263 is finished, or when it is determined that the received message is not a connection condition information message (step S262: No), the controller 230 finishes the processing of the received message.

As heretofore described, according to the terminal apparatus 2 in the embodiment, terminal apparatus to which is allotted apparatus identification information having a predetermined relationship with channel identification information also operates as apparatus which manage the condition of the hierarchical structure of the channel corresponding to the channel identification information. As the controller 230 receives and stores information from these apparatus on the content distribution apparatus and terminal apparatus connection condition and, on determining that a message addressed to its own terminal apparatus is a connection destination introduction request message, selects a connection destination candidate from the stored connection condition information, it is possible to provide a content distribution system having a tree-shaped or chain-shaped hierarchical structure, without providing a separate connection destination management server apart from the content distribution apparatus and terminal apparatus.

Although, in the heretofore described embodiment, a description has been given with the IP address as an example of the location information of the content distribution apparatus 1 and terminal apparatus 2, not being limited to this, it also being acceptable, for example, to make a combination of the IP address and a port number the location information, it is sufficient that it is information which enables an access to the content distribution apparatus 1 and terminal apparatus 2 in the network 6.

Also, although it has been taken that the channel ID, and the location information of the content distribution apparatus, are included in the channel registration message, it is also acceptable to include terminal ID of the content distribution apparatus instead of the location information of the content distribution apparatus. Furthermore, although it has been taken that the channel ID of the channel being participated in, and the location information of the terminal apparatus, are included in the notification of the connection condition information of the participation in the hierarchical structure, it is also acceptable to include terminal ID of the terminal apparatus instead of the location information of the terminal apparatus. In this case, the connection management terminal apparatus registers the terminal ID of the terminal apparatus and content distribution apparatus, as connection condition information, in the connection condition information table. Then, in response to a connection destination introduction request message from the connection request terminal apparatus, the connection management terminal apparatus notifies the connection request terminal apparatus of terminal ID of a connection destination candidate. The connection request terminal apparatus, based on the terminal ID of the connection destination candidate, asks the connection destination candidate for a connection. In this way, when participating in the channel hierarchical structure, as it is possible to ask for a connection to the connection destination candidate, using the DHT routing, based on the terminal ID, even in the event that the IP address has changed, there is a high possibility of connecting to the connection destination candidate using the DHT routing. It also being acceptable that the channel ID, and the terminal ID and location information of the content distribution apparatus, are included in the channel registration message and notification of the connection condition information, in this case, the connection management terminal apparatus notifies the connection request terminal apparatus of the terminal ID and location information of the content distribution apparatus, and the connection request terminal apparatus can carry out a connection with the connection destination candidate, based on either the terminal ID or location information.

Also, instead of the location information of the content holding terminal apparatus, it is also acceptable to have the terminal ID of the content holding terminal apparatus as information specifying the content holding terminal apparatus in the content holding terminal apparatus registration message and index table. In this case, the root terminal apparatus, based on the content holding terminal apparatus registration message, registers the terminal ID of the content holding terminal apparatus in the index table. Then, in response to a content holding terminal apparatus search message from the request terminal apparatus, the root terminal apparatus notifies of the terminal ID of the content holding terminal apparatus. The request terminal apparatus, based on the terminal ID of the content holding terminal apparatus, asks for a download of content data. In this way, when asking for a download, as it is possible to ask the content holding terminal apparatus, using the DHT routing, based on the terminal ID, even in the event that the IP address has changed, there is a high possibility of connecting to the connection destination candidate using the DHT routing. It also being acceptable that the terminal ID and location information of the content holding terminal apparatus are included in the content holding terminal apparatus registration message and index table, in this case, the root terminal apparatus notifies the request terminal apparatus of the terminal ID and location information of the content holding terminal apparatus, and the request terminal apparatus can ask the content holding terminal apparatus for the content data, based on either the terminal ID or location information.

It is also acceptable that the connection destination candidate which the connection management terminal apparatus transmits to the connection request terminal apparatus, in the heretofore described step S260, is in a list format including a plurality of connection destination candidates. At this time, the connection management terminal apparatus selects a predetermined quantity from the connection condition information table, and transmits the connection destination candidates to the connection request terminal apparatus in the list format. The controller of the connection request terminal apparatus can select an optional one connection destination candidate from the plurality of connection destination candidates transmitted in this way, and ask for a connection to the connection destination candidate. Consequently, the controller of the connection request terminal apparatus, when it is not possible to connect to the connection destination candidate, can select another connection destination candidate from the received plurality of connection destination candidates, and ask for a connection thereto, meaning that it is unnecessary to again transmit a connection destination introduction request message to the connection management terminal apparatus. Also, it also being possible for the connection management terminal apparatus to take all the information in the connection condition information table as the connection destination candidates to be transmitted to the connection request terminal apparatus, in this case, there being no need for the connection management terminal apparatus to select the connection destination candidates, the process becomes simpler.

5. Modification Example 1

In the heretofore described embodiment, the connection management terminal apparatus transmits, to the connection request terminal apparatus, a connection destination candidate for the hierarchical structure of the channel corresponding to a connection destination introduction request message, and the connection request terminal apparatus asks for a connection to the connection destination candidate, but it is also acceptable to arrange in such a way that the connection management terminal apparatus asks the connection destination candidate to connect to the connection request terminal apparatus.

Figure 21:
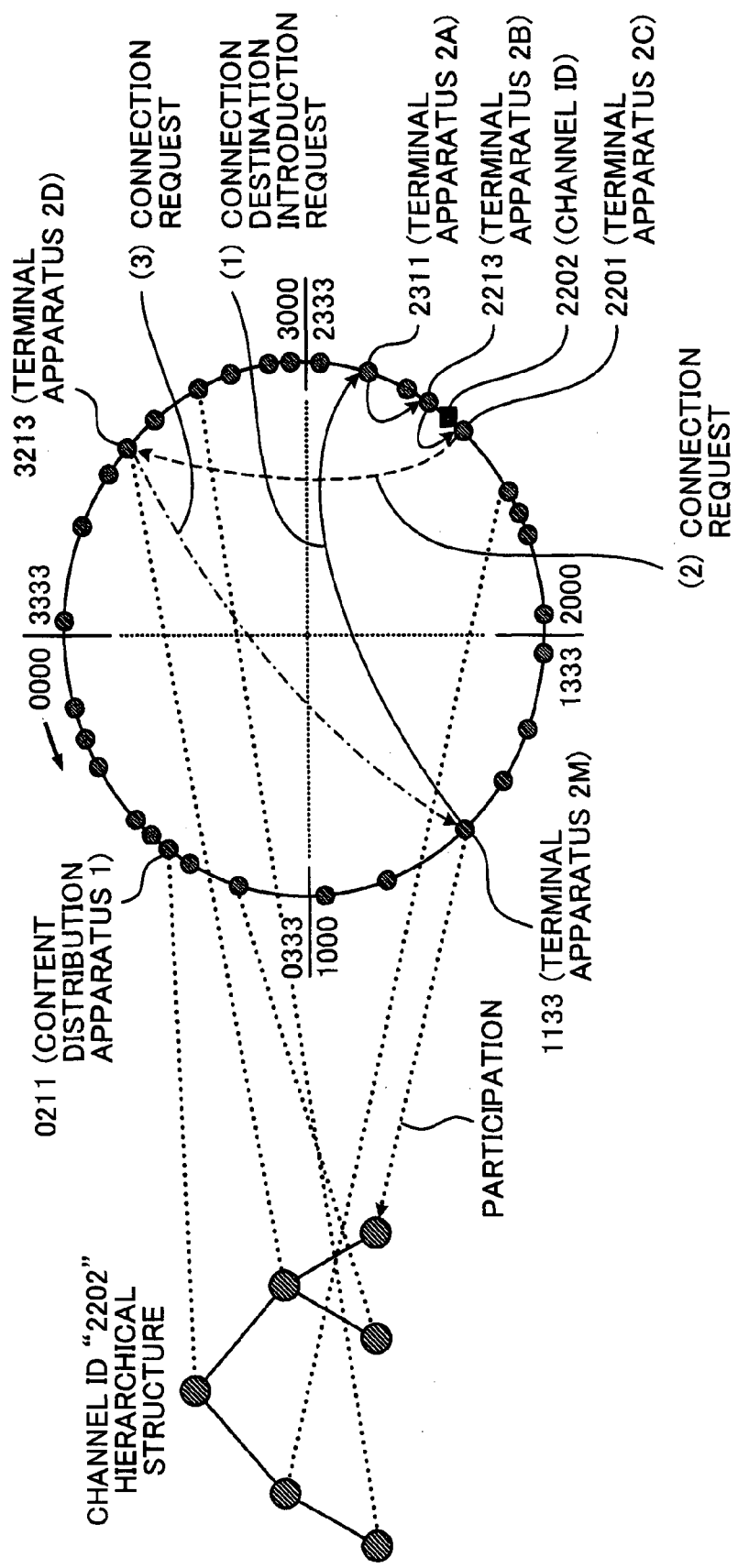
FIG. 21 is a diagram showing an example of an outline operation of a content distribution system in a modification example 1.

In this case, as shown in FIG. 21, the connection management terminal apparatus 2C retrieves a connection destination candidate for the hierarchical structure of the channel asked for by the connection request terminal apparatus 2M, from the connection condition information table corresponding to the channel. Then, based on the retrieved connection destination candidate (its location information), the connection management terminal apparatus 2C transmits a connection request message causing a connection with the connection request terminal apparatus 2M, which has transmitted a connection destination introduction request message. The location information of the connection request terminal apparatus 2M is included in the connection request message. The connection destination candidate 2D, on receiving the connection request message from the connection management terminal apparatus 2C, connects to the connection request terminal apparatus 2M, which is the connection destination terminal apparatus described in the connection request message.

That is, the controller 230 of the terminal apparatus 2 functions as a connection request message transmission process module for the connection destination candidate selected by the connection destination candidate selection module, as a connection request process module which, on receiving a connection request message from another terminal apparatus 2, connects to the connection destination terminal apparatus described in the connection request message (the terminal apparatus which has transmitted the connection destination introduction request message), and the like.

It is also possible to form the hierarchical structure with the method whereby the connection management terminal apparatus asks the connection destination candidate to connect to the connection request terminal apparatus in this way.

6. Modification Example 2

In the heretofore described embodiment, the root terminal apparatus transmits the location information of the content data to the request terminal apparatus, and the request terminal apparatus acquires the content data by downloading them from the content holding terminal apparatus, but it is also acceptable to arrange in such a way that the root terminal apparatus asks the content holding terminal apparatus to transmit the content data to the request terminal apparatus.

Figure 22:
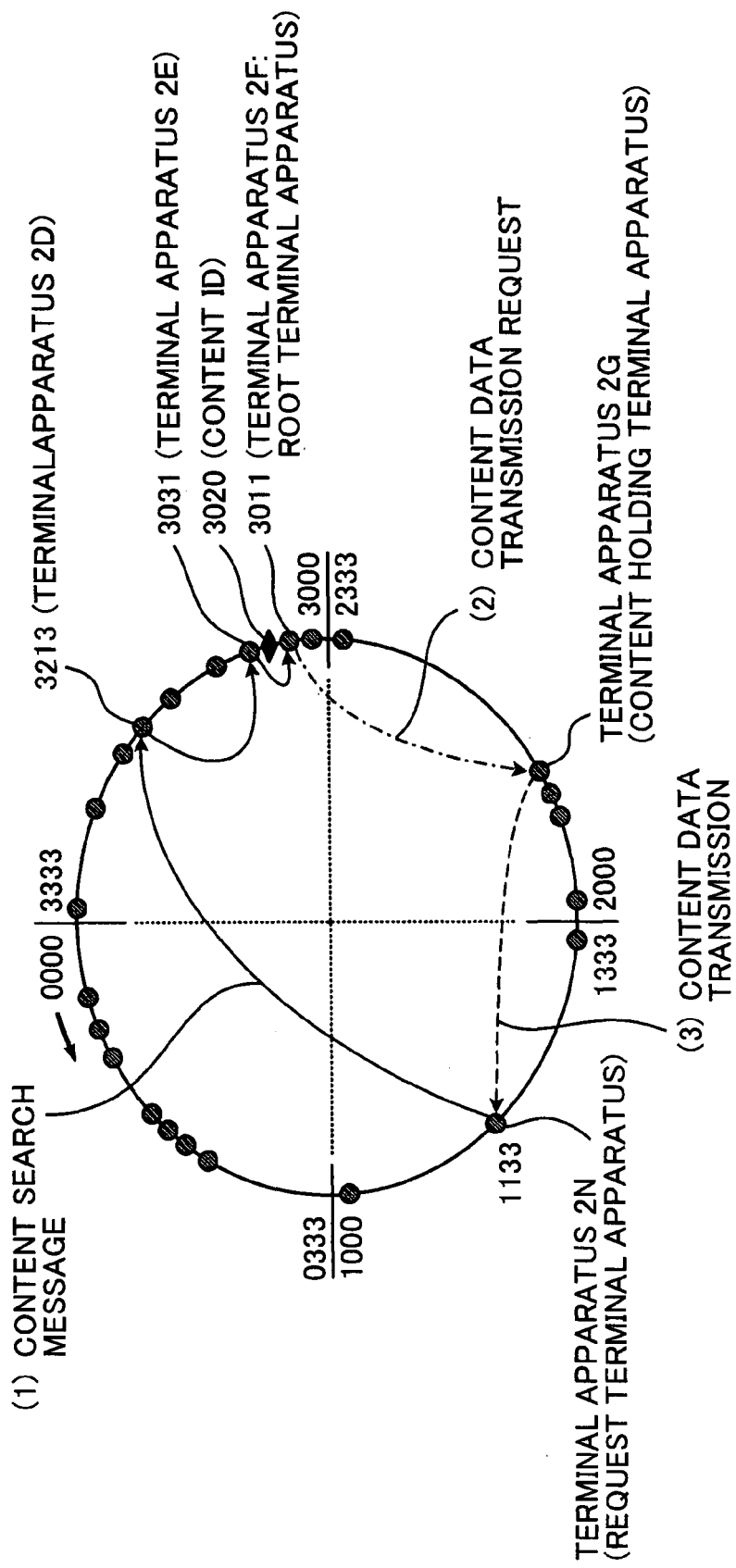
FIG. 22 is a diagram showing an example of an outline operation of a content distribution system in a modification example 2.

In this case, as shown in FIG. 22, the root terminal apparatus 2F retrieves the location information of the content holding terminal apparatus 2G, which is holding the content data asked for by the request terminal apparatus 2N, from the index table 222. Then, based on the location information of the content holding terminal apparatus 2G, the root terminal apparatus 2F transmits a content data request message asking for content data, including the location information of the request terminal apparatus 2N, to the content holding terminal apparatus 2G. The content holding terminal apparatus 2G, on receiving the content data transmission request, transmits the content data corresponding to the content data transmission request in response to the location information of the request terminal apparatus 2N included in the content data transmission request.

That is, the controller 230 of the terminal apparatus 2, when receiving a content holding terminal apparatus search message from the request terminal apparatus 2N as the root terminal apparatus 2F, functions as the distribution source information determination module, which determines the existence or otherwise in the index table 222, which is the distribution source information storage module, of the location information of the content holding terminal apparatus holding the content data in the content holding terminal apparatus search message, as a content data distribution request message transmission process module which, on the distribution source information determination module determining that the location information exists, based on the information stored in the index table, generates a content data distribution request message, causing a distribution of the content data from the content holding terminal apparatus, and transmits the content data distribution request message to the terminal apparatus which has transmitted the content holding terminal apparatus search message, and as a content data transmission process module which, after receiving the content data distribution request message, transmits the content data described in the content data distribution request message to a transmission destination terminal apparatus, in place of the function of the content holding terminal apparatus information return module.

The request terminal apparatus 2N transmits the content holding terminal apparatus search message using the download destination search module, and the download data reception process module receives the content data corresponding to the content holding terminal apparatus search message from the content holding terminal apparatus 2G.

In this way, the root terminal apparatus can also ask the content holding terminal apparatus to transmit the content data to the request terminal apparatus.

7. Other Modification Examples

Also, although a description has been given with a Pastry type of content distribution system as an example of the DHT routing format in the content distribution system S, not being limited to this, the invention is also applicable to a content distribution system such as a kademlia type, a chord type, a Viceroy type, or a CAN type, of which message forwarding methods differ.

Also, the invention is not limited to the heretofore described embodiment. The heretofore described embodiment being an exemplification, any embodiment having essentially the same configuration as the technological idea described in the claims of the invention, and achieving the same effect, is encompassed in the technological scope of the invention in whatsoever case.

Also, all the disclosures of Japanese Patent Application (No. 2006-270135), including the specification, the claims, the drawings and the abstract, filed on Sep. 29, 2006, are incorporated herein by reference.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited hereby, but is to be determined by the claims which follow.

What is claimed is:

1. A content distribution system comprising a terminal apparatus for use as one of a plurality of terminal apparatus logically connected in multilayer in a hierarchical structure in a network, with a content distribution apparatus which stream-distributes content data as an apex, the content data transmitted from the content distribution apparatus being sequentially stream-distributed by a relay function of the terminal apparatus from an upstream terminal apparatus to a downstream terminal apparatus in the hierarchical structure, wherein channel identification information is allotted to each channel in which the content data are stream-distributed, and unique apparatus identification information is allotted to each of the plurality of terminal apparatus, the terminal apparatus including;

a routing table storage module which stores a routing table in which are correlated one portion of apparatus identification information among the apparatus identification information in the content distribution system, with location information of apparatus corresponding to the apparatus identification information;

a connection process module which, in response to participating in the content distribution system, transmits a connection destination introduction request message for connecting to a connection destination candidate, of the content distribution system, based on the information of the routing table module, and the channel identification information as destination identification information, and connects to the connection destination candidate;

a message destination determination module which, in response to receiving a message via the network, based on the destination identification information of the received message and the routing table, determines whether the received message is addressed to its own terminal apparatus;

a connection condition information storage module which, in response to determining by the message destination determination module that the received message is addressed to its own terminal apparatus, and that the received message is a connection condition information message including information on a connection condition of the content distribution apparatus or the terminal apparatus, stores the connection condition information; and a connection destination candidate selection module which, in response to determining by the message destination determination module that the received message is addressed to its own terminal apparatus, and that the received message is the connection destination introduction request message, selects a connection destination candidate based on the connection condition information stored in the connection condition information storage module; and the content distribution apparatus including a routing table storage module which stores a routing table in which are correlated one portion of apparatus identification information among the apparatus identification information in the content distribution system, and location information of apparatus corresponding to the apparatus identification information; and a channel registration message transmission process module which. based on the routing table and the channel identification information indicating a channel in which its own content distribution apparatus stream-distributes content data as destination identification information, transmits a channel registration message including location information and/or apparatus identification information of its own content distribution apparatus.

2. The content distribution system according to claim 1, wherein the channel registration message transmission process module of the content distribution apparatus regularly transmits the channel registration message.

3. A terminal apparatus for use as one of a plurality of terminal apparatus in a content distribution system which is of a distribution format in which the plurality of terminal apparatus are logically connected in multilayer in a hierarchical structure in a network, with a content distribution apparatus which stream-distributes content data as an apex, and the content data transmitted from the content distribution apparatus are sequentially stream-distributed by a relay function of the terminal apparatus from an upstream terminal apparatus to a downstream terminal apparatus in the hierarchical structure, wherein channel identification information is allotted to each channel in which the content data are stream-distributed, and unique apparatus identification information is allotted to each of the plurality of terminal apparatus, the terminal apparatus comprising;

a routing table storage module which stores a routing table in which are correlated one portion of apparatus identification information among the apparatus identification information in the content distribution system, and location information of apparatus corresponding to the apparatus identification information;

a connection process module which, when participating in the hierarchical structure, transmits a connection request message for connecting to a connection destination candidate for the hierarchical structure, based on the information of the routing table storage module, and the channel identification information as destination identification information, and connects to the connection destination candidate;

a message destination determination module which, when receiving a message via the network, based on the destination identification information of the received message and on the routing table, determines whether or not the received message is addressed to its own terminal apparatus;

a connection condition information storage module which, when it is determined by the message destination determination module that the received message is addressed to its own terminal apparatus, and that the received message is a connection condition information message including information on a connection condition of the content distribution apparatus or the terminal apparatus, stores the connection condition information; and a connection destination candidate selection module which, when it is determined by the message destination determination module that the received message is addressed to its own terminal apparatus, and that the received message is the connection destination introduction request message, selects a connection destination candidate from the connection condition information stored in the connection condition information storage module the content distribution apparatus including a routing table storage module which stores a routing table in which are correlated one portion of apparatus identification information among the apparatus identification information in the content distribution system, and location information of apparatus corresponding to the apparatus identification information; and a channel registration message transmission process module which based on the routing table and the channel identification information indicating a channel in which its own content distribution apparatus stream-distributes content data as destination identification information, transmits a channel registration message including location information and/or apparatus identification information of its own content distribution apparatus.

4. The terminal apparatus according to claim 3, further comprising: a connection destination candidate transmission process module which transmits the connection destination candidate selected by the connection destination candidate selection module, via the network, to the terminal apparatus which has transmitted the connection destination introduction request message, wherein the connection process module connects to the received connection destination candidate.

5. The terminal apparatus according to claim 3, further comprising:
   a connection request message transmission process module which transmits a connection request message to the connection destination candidate selected by the connection destination candidate selection module, causing it to connect to the terminal apparatus which has transmitted the connection destination introduction request message, and
   a connection request process module which, after receiving the connection request message, connects to a connection destination terminal apparatus described in the connection request message.

6. The terminal apparatus according to claim 3, further Comprising:
   a connection information notification module which, when connecting to the connection destination candidate, transmits the connection condition information message, based on the routing table, and the channel identification information as destination identification information.

7. The terminal apparatus according to claim 6, wherein the connection information notification module, after connecting to the connection destination candidate, regularly transmits the connection condition information message, based on the routing table, and the channel identification information as destination identification information.

8. The terminal apparatus according to claim 3, wherein the message destination determination module, when the apparatus identification information which has the smallest difference from the destination identification information of the message is allotted to its own terminal apparatus, determines that the received message is addressed to its own terminal apparatus.

9. The terminal apparatus according to claim 3, further comprising:
   a content data storage module which stores content data;
   a content holding terminal apparatus registration message generation module which, when storing content data in the content data storage module, functions as a content holding terminal apparatus, and generates a content holding terminal apparatus registration message including content identification information of the stored content data, and apparatus identification information and/or location information of its own terminal apparatus;
   a content holding terminal apparatus registration message transmission process module which selects a transmission destination terminal apparatus from the routing table, and transmits the content holding terminal apparatus registration message, with the identification information of the stored content data as destination identification information;
   a content holding terminal apparatus information storage module which, when a received message is the content holding terminal apparatus registration message, stores the apparatus identification information and/or location information of the content holding terminal apparatus included in the content holding terminal apparatus registration message;
   a distribution source information determination module which, when a received message is a content holding terminal apparatus search message searching for the apparatus identification information and/or location information of the content holding terminal apparatus, determines the existence or otherwise in a distribution source information storage module of the apparatus identification information and/or location information of the content holding terminal apparatus holding the content data in the content holding terminal apparatus search message;
   a distribution source information message transmission process module which, on the distribution source information determination module determining that the apparatus identification information and/or location information exists, retrieves the apparatus identification information and/or location information of the content holding terminal apparatus from the distribution source information storage module, generates a distribution source information message, and transmits the distribution source information message to the terminal apparatus which has transmitted the content holding terminal apparatus search message; and
   a content data request message transmission process module which, after receiving the distribution source information message, transmits a content data request message, asking for content data, to the content holding terminal apparatus described in the distribution source information message.

10. The terminal apparatus according to claim 3, further comprising:
    a content data storage module which stores content data;
    a content holding terminal apparatus registration message generation module which, when storing content data in the content data storage module, functions as a content holding terminal apparatus, and generates a content holding terminal apparatus registration message including content identification information of the stored content data, and apparatus identification information and/or location information of its own terminal apparatus;
    a content holding terminal apparatus registration message transmission process module which selects a transmission destination terminal apparatus from the routing table, and transmits the content holding terminal apparatus registration message, with the identification information of the stored content data as destination identification information;
    a content holding terminal apparatus information storage module which, when a received message is the content holding terminal apparatus registration message, stores the apparatus identification information and/or location information of the content holding terminal apparatus included in the content holding terminal apparatus registration message;

a distribution source information determination module which, when a received message is a content holding terminal apparatus search message searching for the apparatus identification information and/or location information of the content holding terminal apparatus, determines the existence or otherwise in the distribution source information storage module of the apparatus identification information and/or location information of the content holding terminal apparatus holding the content data in the content holding terminal apparatus search message;

a content data distribution request message transmission process module which, on the distribution source information determination module determining that the apparatus identification information and/or location information exists, generates a content data distribution request message causing a distribution of the content data from the content holding terminal apparatus to the terminal apparatus which has transmitted the content holding terminal apparatus search message, based on the information stored in the distribution source information storage module, and transmits the content dab distribution request message to the content holding terminal apparatus; and a content data transmission process module which, after receiving the content data distribution request message, transmits the content data described in the content data distribution request message to a transmission destination terminal apparatus.

11. A non-transitory recording medium on which is recorded, so as to be computer readable, a program for causing a computer to function as each module of the terminal apparatus according to claim 3.

12. A content distribution method for use in a content distribution system in which a terminal apparatus for use as one of a plurality of terminal apparatus is logically connected in multilayer in a hierarchical structure in a network, with a content distribution apparatus which stream-distributes content data as an apex, the content data transmitted from the content distribution apparatus being sequentially stream-distributed by a relay function of the terminal apparatus from an upstream terminal apparatus to a downstream terminal apparatus in the hierarchical structure, wherein channel identification information is allotted to each channel in which the content data are stream-distributed, and unique apparatus identification information is allotted to each of the plurality of terminal apparatus, the method comprising:

a step of the terminal apparatus storing a routing table in which are correlated one portion of apparatus identification information among the apparatus identification information in the content distribution system, and location information of apparatus corresponding to the apparatus identification information;

a step of the terminal apparatus, when participating in the hierarchical structure, transmitting a connection destination introduction request message for connecting to a connection destination candidate for the hierarchical structure, based on the routing table, and the channel identification information as destination identification information;

a step of the terminal apparatus, when receiving a message via the network, based on the destination identification information of the received message and on the routing table, determining whether or not the received message is addressed to its own terminal apparatus;

a step of the terminal apparatus, when it is determined by the message destination determination step that the received message is addressed to its own terminal apparatus, and that the received message is a connection condition information message including information on a connection condition of the content distribution apparatus or the terminal apparatus, storing the connection condition information; and a step of the terminal apparatus, when it is determined by the message destination determination step that the received message is addressed to its own terminal apparatus, and that the received message is the connection destination introduction request message, selecting a connection destination candidate from the stored connection condition information a step of the content distribution apparatus storing a routing table in which are correlated one portion of apparatus identification information among the apparatus identification information in the content distribution system, and location information of apparatus corresponding to the apparatus identification information; and a step of the content distribution apparatus transmitting a channel registration message including location information and/or apparatus identification information of the content distribution apparatus, based on the routing table and the channel identification information indicating a channel in which the content distribution apparatus stream-distributes content data as destination identification information.

* * * * *